United States Patent [19]
Piegl et al.

[11] Patent Number: 5,428,726
[45] Date of Patent: Jun. 27, 1995

[54] TRIANGULATION OF RANDOM AND SCATTERED DATA

[75] Inventors: Les Piegl; Tsung-Pao Fang, both of Tampa, Fla.

[73] Assignee: University of South Florida, Tampa, Fla.

[21] Appl. No.: 938,014

[22] Filed: Aug. 28, 1992

[51] Int. Cl.$^6$ .............................................. G06F 15/00
[52] U.S. Cl. ..................................................... 395/141
[58] Field of Search ............... 395/133, 143, 142, 141, 395/129; 364/557, 578; 345/133, 134

[56] References Cited

U.S. PATENT DOCUMENTS

| | | | |
|---|---|---|---|
| 4,639,878 | 1/1987 | Day et al. | 364/513 |
| 4,775,946 | 10/1988 | Anjyo | 364/522 |
| 4,912,664 | 3/1990 | Weiss et al. | 364/577 |
| 4,933,889 | 6/1990 | Meshkat et al. | 364/578 |
| 4,963,889 | 10/1990 | Hatch | 342/357 |
| 5,027,281 | 6/1991 | Rekow et al. | 364/474.24 |

OTHER PUBLICATIONS

"Locally equiangular triangulations" by R. Sibson, School of Mathematics, University of Bath, published Mar., 1977, The Computer Journal, vol. 21, No. 3, pp. 243–245.

"Triangulation of plan regions with applications" by B. A. Lewis and J. S. Robinson, British Steel Corporation, Teesside Laboratories, The Computer Journal, vol. 21, No. 4, pp. 324–332, published Nov., 1976.

"Computing Dirichlet tessellations" by A. Bowyer, School of Mathematics, University of Bath, The Computer Journal, vol. 24, No. 2, pp. 162–166, published Apr., 1980.

*Primary Examiner*—Phu K. Nguyen
*Attorney, Agent, or Firm*—Calfee, Halter & Griswold

[57] ABSTRACT

A rapid and efficient method for triangulating random points is based on a "circular" triangulation strategy that allows the deletion of data points from the data set during triangulation. In one embodiment, data is initially preprocessed by sorting and is put into a sparse matrix, while in another embodiment, data is preprocessed directly into a uniform grid prior to the triangulation strategy. A circular queue is used to govern the triangulation process and allows dynamic update of the internal matrix or grid data structure. A substantial decrease in complexity is provided by the triangulation strategy as the number of points to be searched for triangle points decreases as the triangles are created. The method is stable and fast and is not sensitive to difficult cases such as collinear or nearly collinear points.

26 Claims, 25 Drawing Sheets

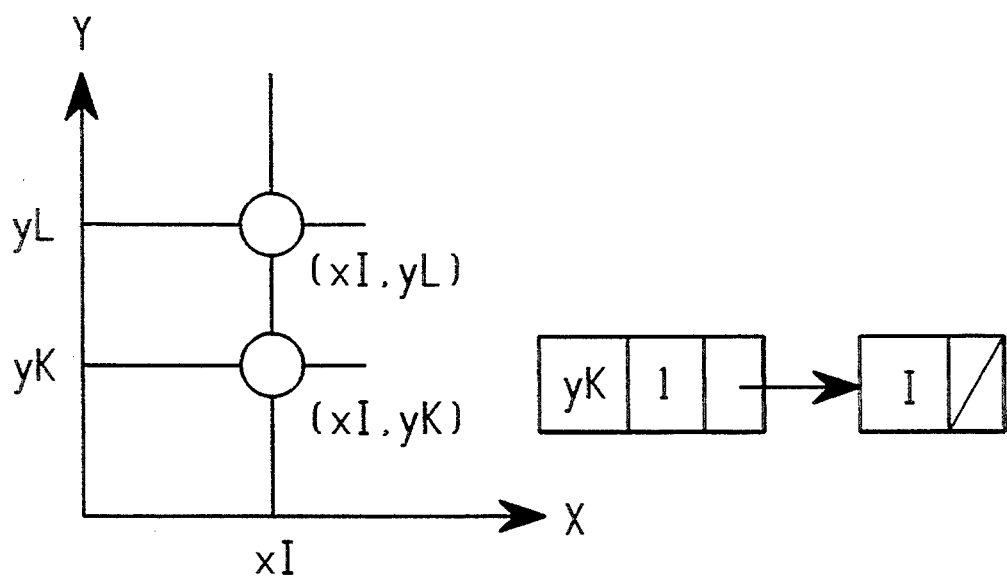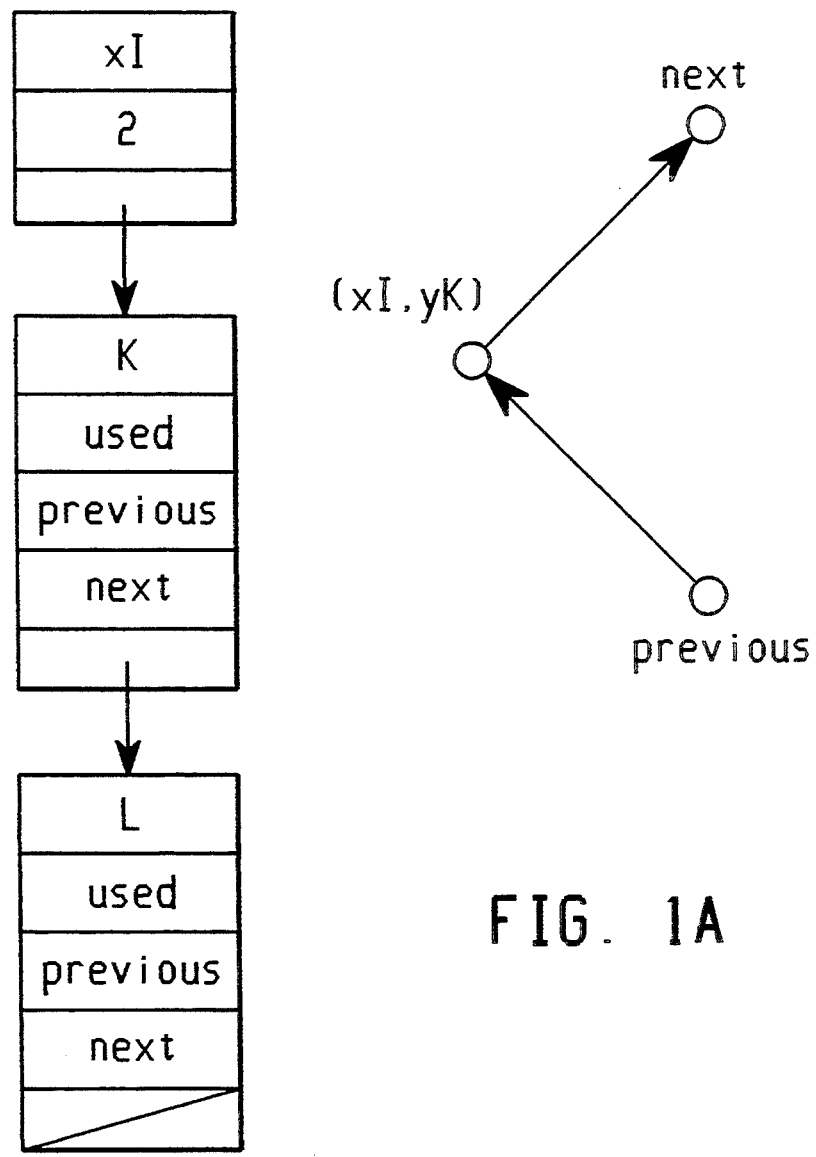
FIG. 1A

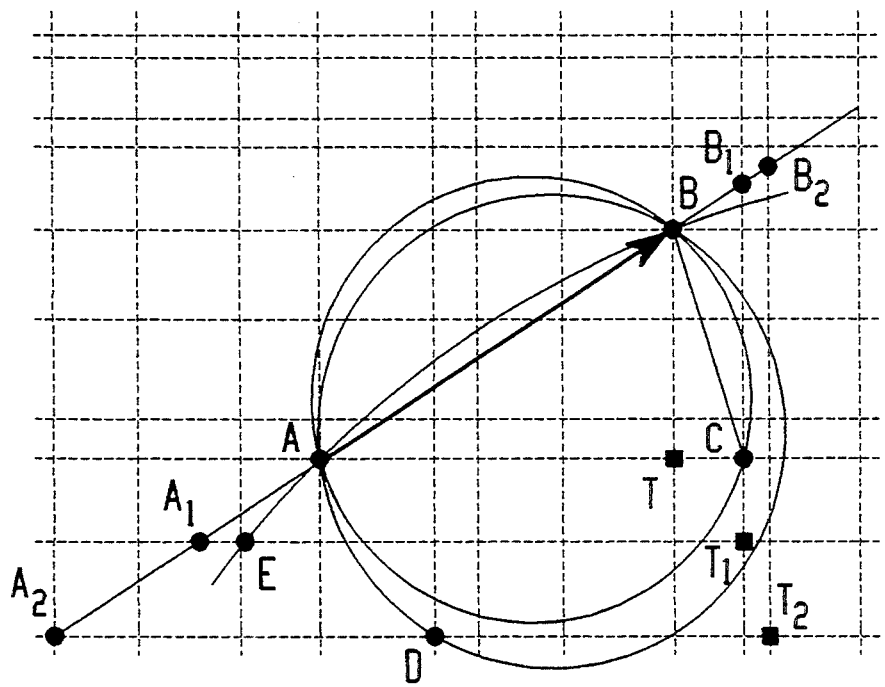
FIG. 3A1
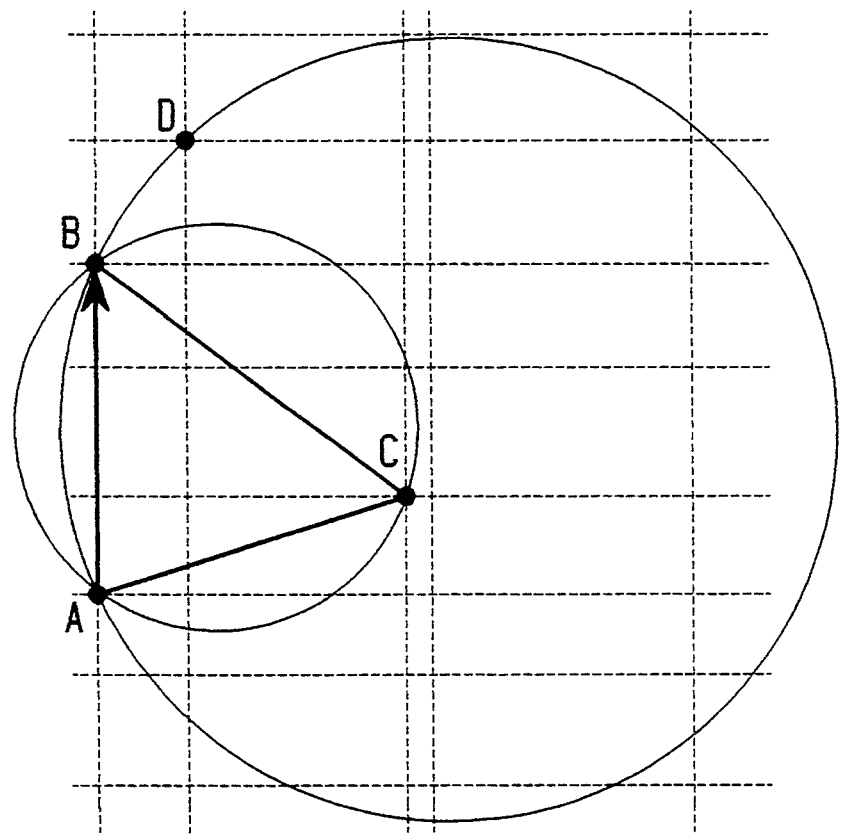
FIG. 3A2

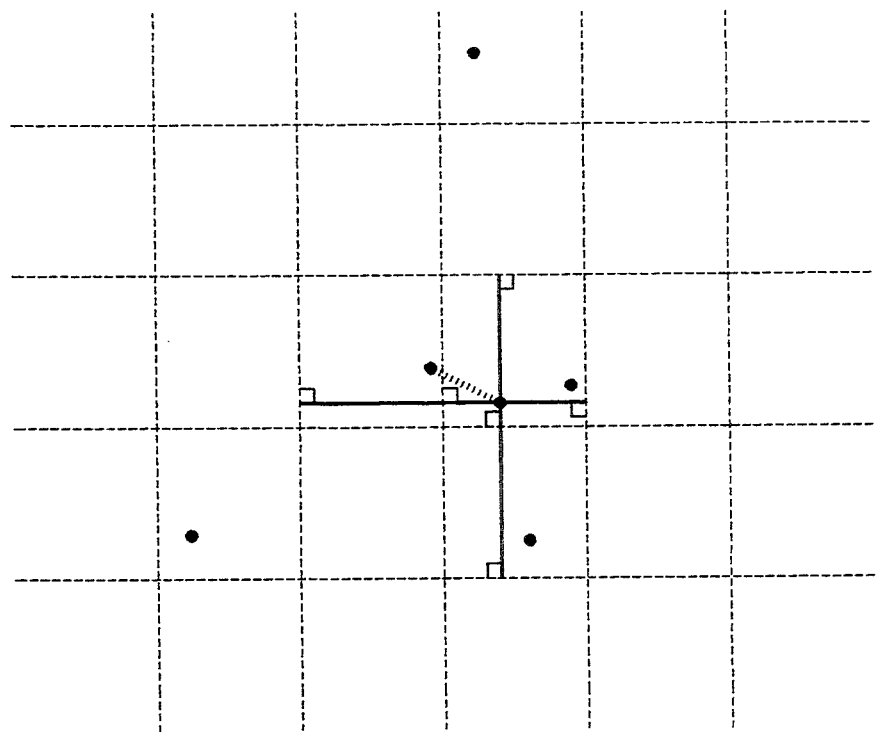
FIG. 3B1
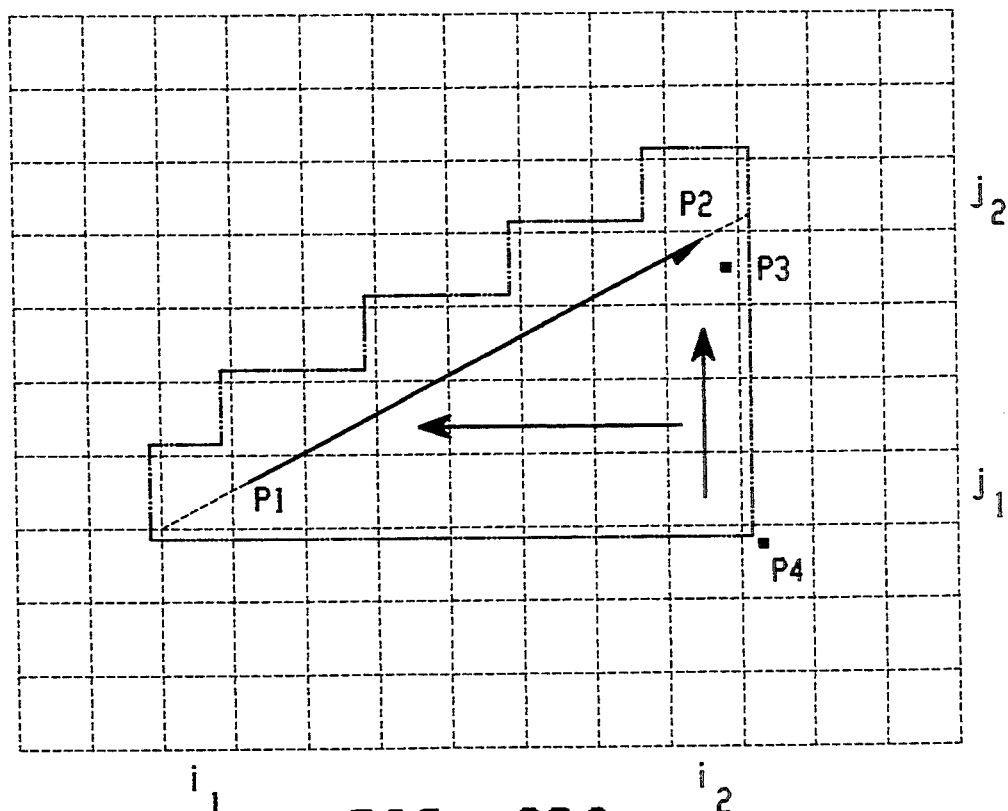
FIG. 3B2

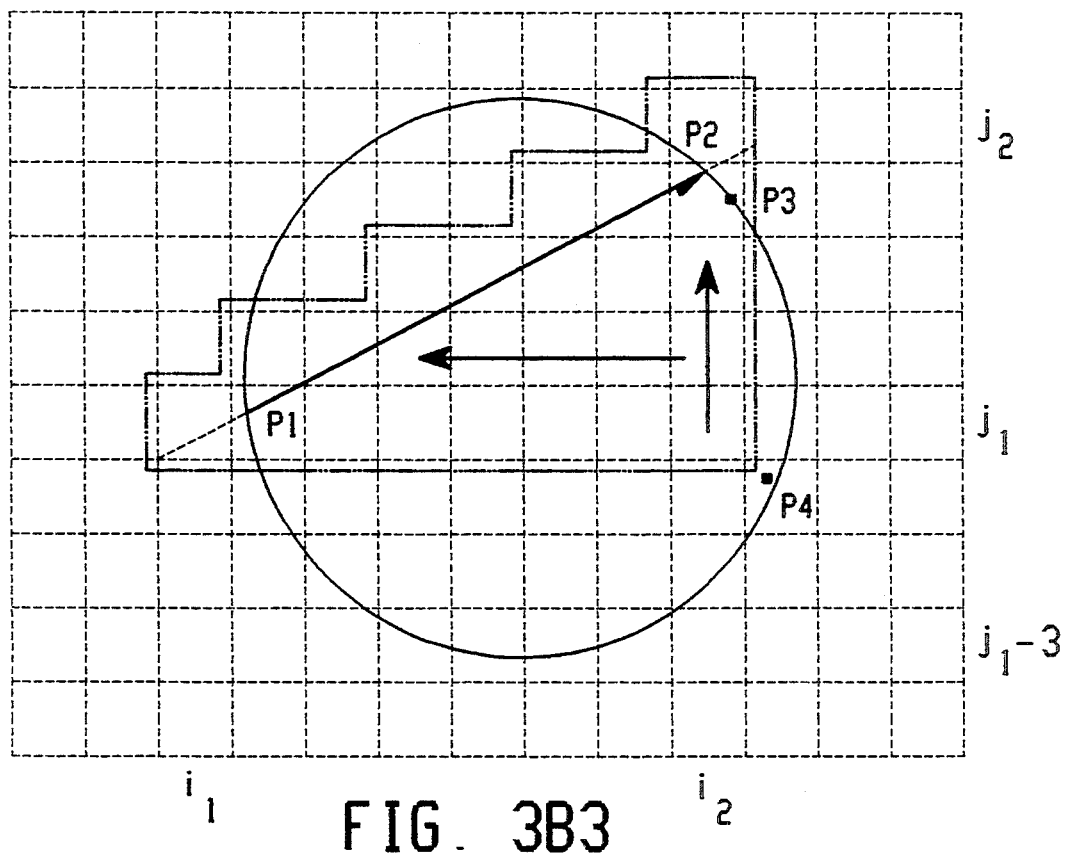
FIG. 3B3
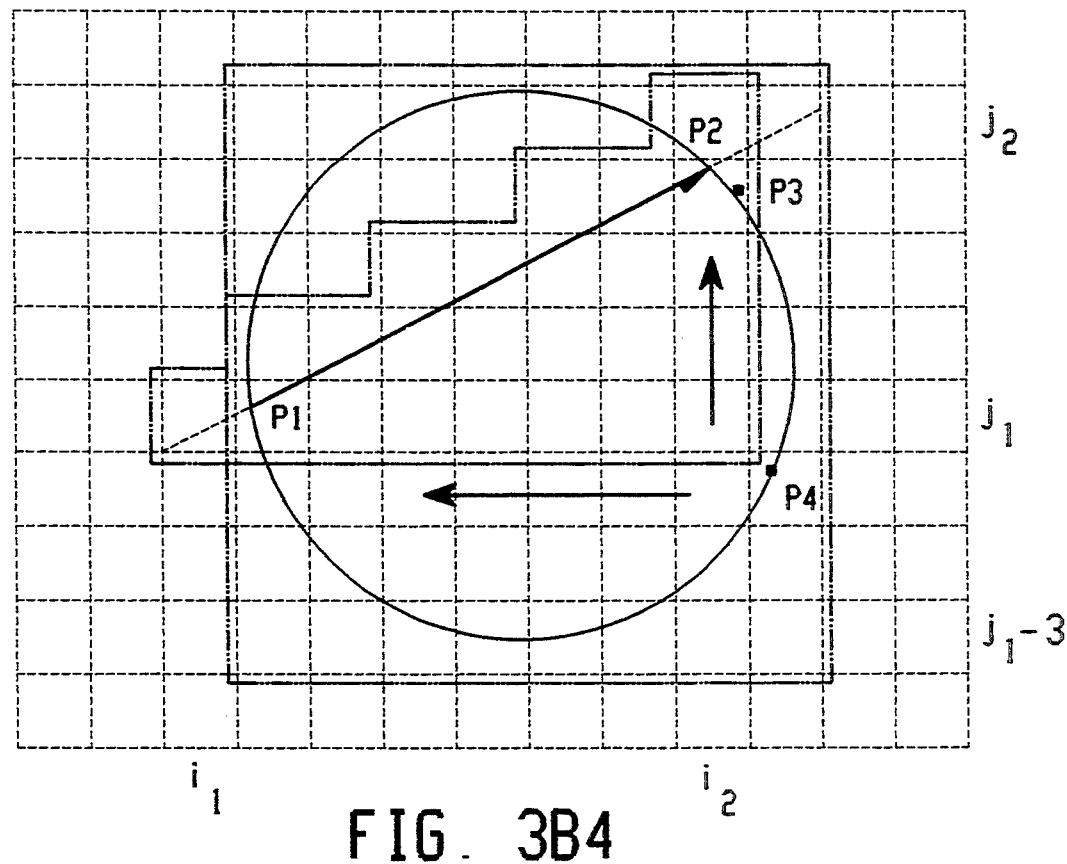
FIG. 3B4

TRIANGULATION OF RANDOM AND SCATTERED DATA

FIELD OF THE INVENTION

The present invention relates generally to triangulating points on a two-dimensional surface, and more particularly to a method for triangulating random and scattered data points.

BACKGROUND

Triangulating random and scattered two-dimensional points on a plane has been the subject of significant research in the past few decades. Triangulating techniques can be used for digital terrain modeling, as well as for mathematical calculations such as fluid flow and heat transfer, and data visualization and rendering. The origins of triangulating data points go back to Voronoi and to Delaunay, and a number of textbooks and papers have extensively covered their properties and algorithms for their constructions. See, for example, M. Shamos, Computational geometry, PhD Thesis, Yale University, New Haven, Conn., 1977; F. Preparata and M. Shamos, Computational Geometry—An Introduction, Springer-Verlag, New York, N.Y., 1985; H. Edelsbrunner, Algorithms in Combinatorial Geometry, Springer-Verlag, New York, N.Y., 1987; D. Rhynsburger, Analytic delineation of Theissen polygons, Geographical Analysis, Vol. 5, No. 2, 1973, pp 133-144; and P. J. Green and R. Sibson, Computing Dirichlet tessellations in the plane, The Computer Journal, Vol 21, No. 2, 1978, pp 168-173.

Most of these papers and books deal with theoretical aspects of the algorithms and give upper bounds on their complexity. Using the widely accepted divide-and-conquer method, one can triangulate a set of points in $\theta(n \log n)$ time. Recent research in computational geometry has gone into decreasing this bound further down in the hope that practical implementation will provide faster execution time.

SUMMARY

The present invention provides a new and useful method which uses a rapid triangulation strategy to process a data structure.

According to one embodiment of the present invention, the survey data is initially pre-processed, i.e., sorted, in the X and Y directions. The sorted data is then put into a data structure comprising a sparse matrix wherein each X and Y value is associated with a particular record.

According to another embodiment of the present invention, the survey data is preprocessed directly into a uniform grid data structure, without being initially sorted. Each data point in the uniform grid structure is associated with one and only one cell.

In either of the embodiments described above, a point "A" in the middle, or nearest the middle, of the data structure is selected to provide an initial point for the triangulation strategy. The nearest point "B" to the initial point "A" in the data structure is then computed to form the first edge of the triangle. Finally, a third point, "C", is computed to form the triangle "ABC" using algorithms which limit the search to the immediate vicinity of the initial edge so that points are found within a few steps. These algorithms are not used if the edge AB is horizontal or vertical. In this case, half boxes are used to search for candidate points.

The triangulation strategy keeps track of the edges in a circular queue, with the current edge always at the rear of the queue. Each time a point for an edge is computed, two new half edges are stored in the queue and an old half edge is deleted. The circular queue is used throughout the triangulation strategy to keep track of the current edge to be used to find the next triangle.

When a point for an edge is computed, the point is flagged as a "used" point. If a used point is employed in a subsequent edge, the edge is checked to determine if a left touch or right touch condition exists, or, in other words, whether the edge is a dual of another edge in the queue. If such a touch condition exists, one of the used points is deleted from the matrix or grid. Deleting an edge point from the data structure decreases the number of points searched to form the triangles, and hence increases the speed at which the triangles are formed. The data structure is searched until the edge list is empty, at which point the triangulation is complete.

It is therefore one object of the present invention to provide a technique for processing random and scattered data which works quickly and efficiently in processing a data structure.

It is another object of the present invention to provide a triangulation strategy for random and scattered data which deletes data points from a data structure during triangulation and thus decreases the complexity of the computations as the triangles are created.

It is still another object of the present invention to provide a triangulation strategy for data points which is numerically stable, and where coincident and collinear points are handled automatically.

It is yet another object of the present invention to provide a technique for triangulating random data points wherein the points are initially sorted, put into a sparse matrix, and a triangulation strategy is utilized to produce complete triangulation of the data.

It is yet another object of the present invention to provide a technique for triangulating random data points which does not need initial sorting of the data, wherein the points are initially preprocessed in a uniform grid, and a triangulation strategy is utilized to provide complete triangulation of the data.

It is still another object of the present invention to provide a direct method for triangulating data which produces the convex hull of the data set at no extra overhead cost.

Other objects of the present invention will become apparent from the following detailed description and accompanying drawings which form a part of the specification.

DRAWINGS

FIG. 1A is a schematic representation of the data structure used in the triangulation process for a sparse matrix according to a first embodiment of the present invention;

Figure 2A:
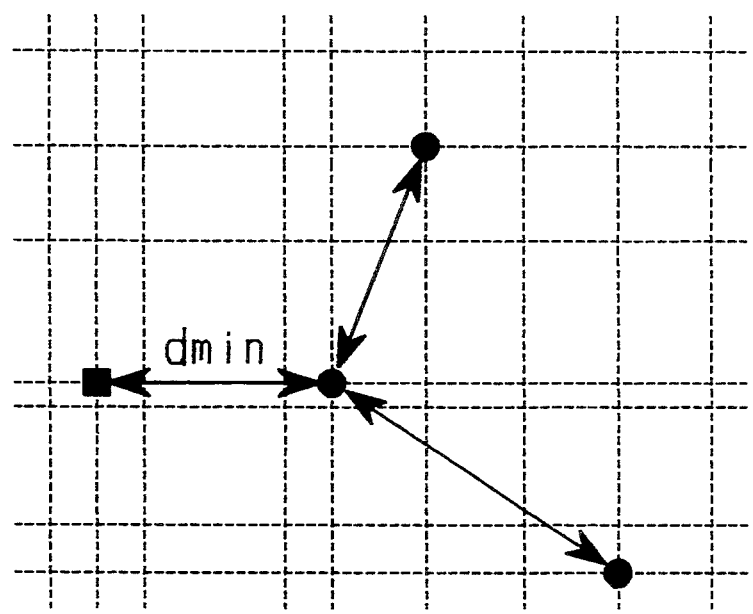
FIG. 2A is a schematic representation of the steps in the process to determine the nearest point from the middle of the data set in the sparse matrix.
Figure 2B:
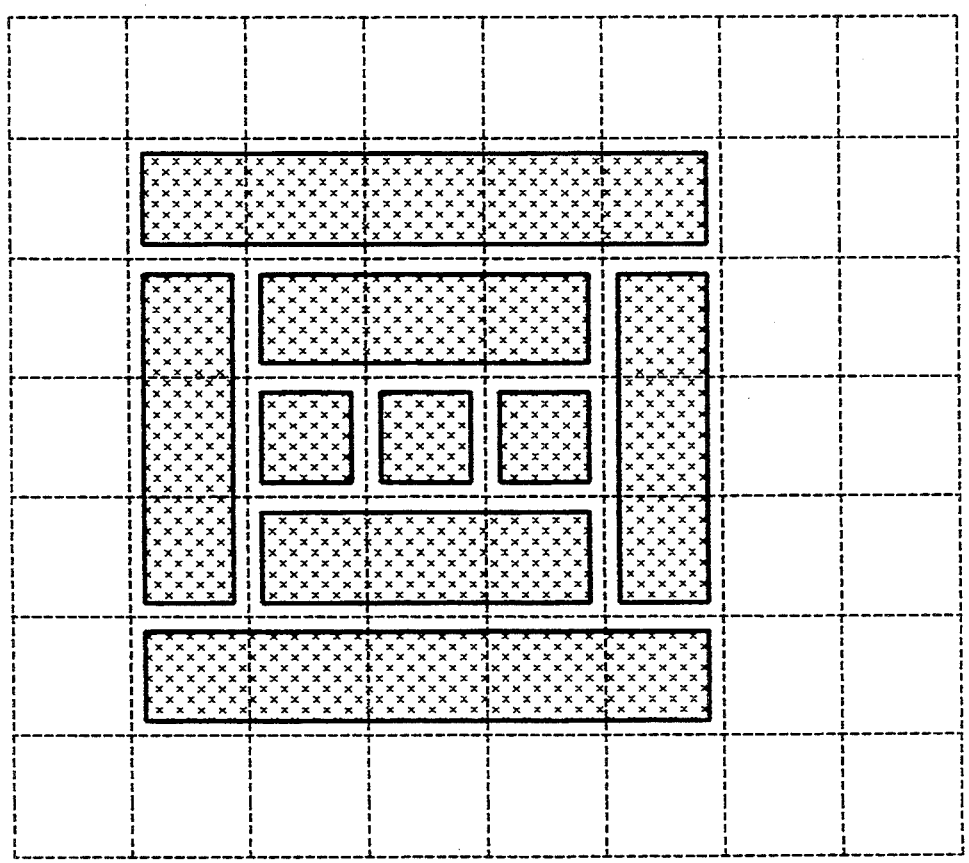
FIG. 2B is a schematic representation of the steps in the process to determine the nearest point from the middle of the data set in a uniform grid.
Figure 4:
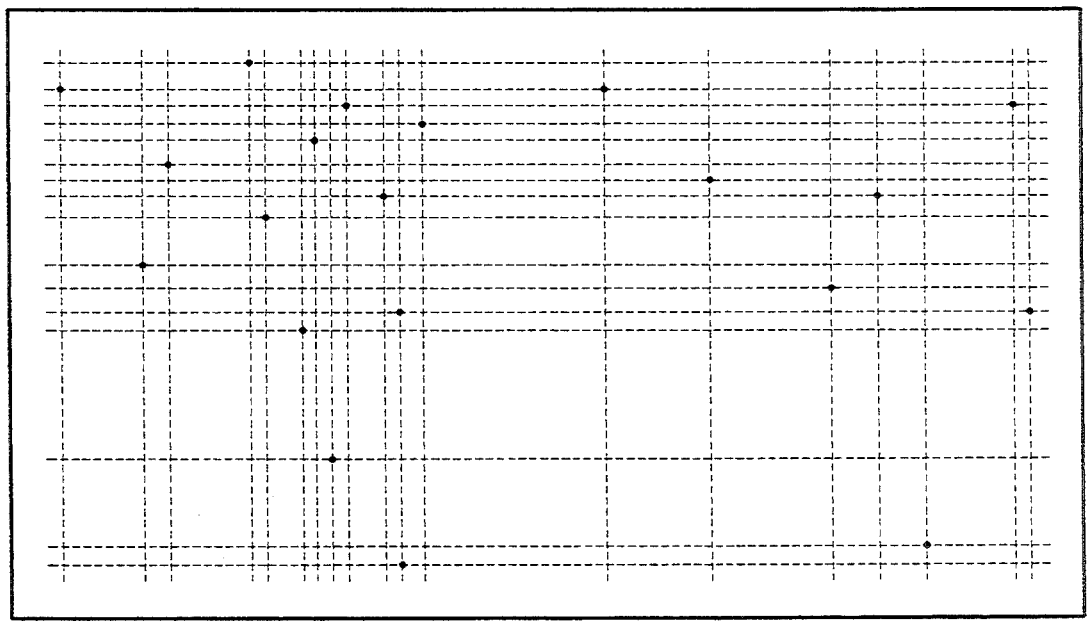
Figure 5:
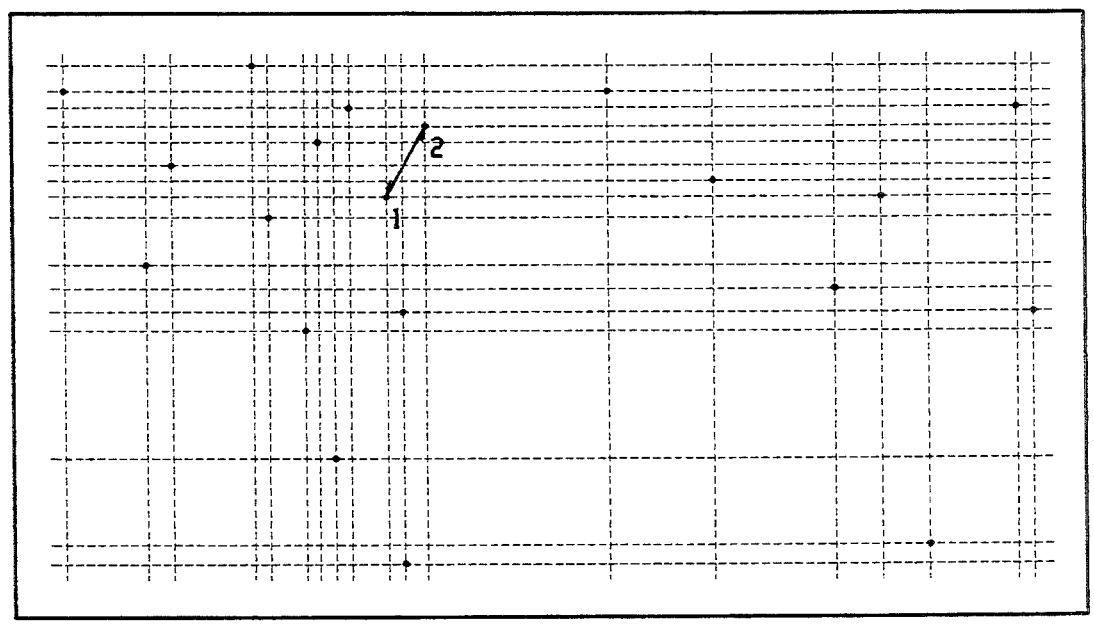
Figure 6:
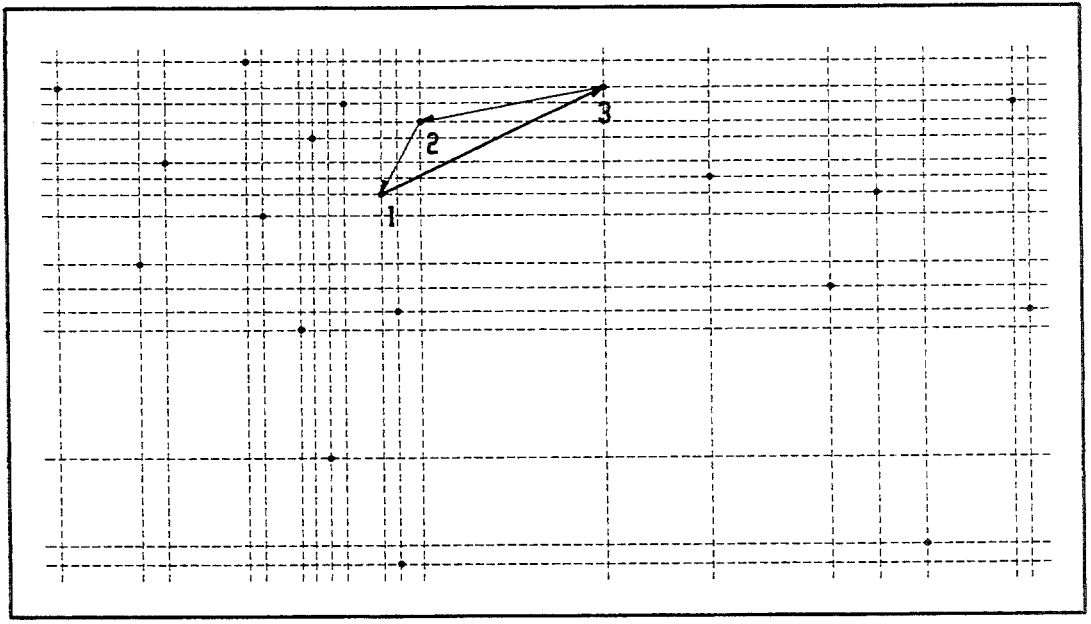
Figure 7:
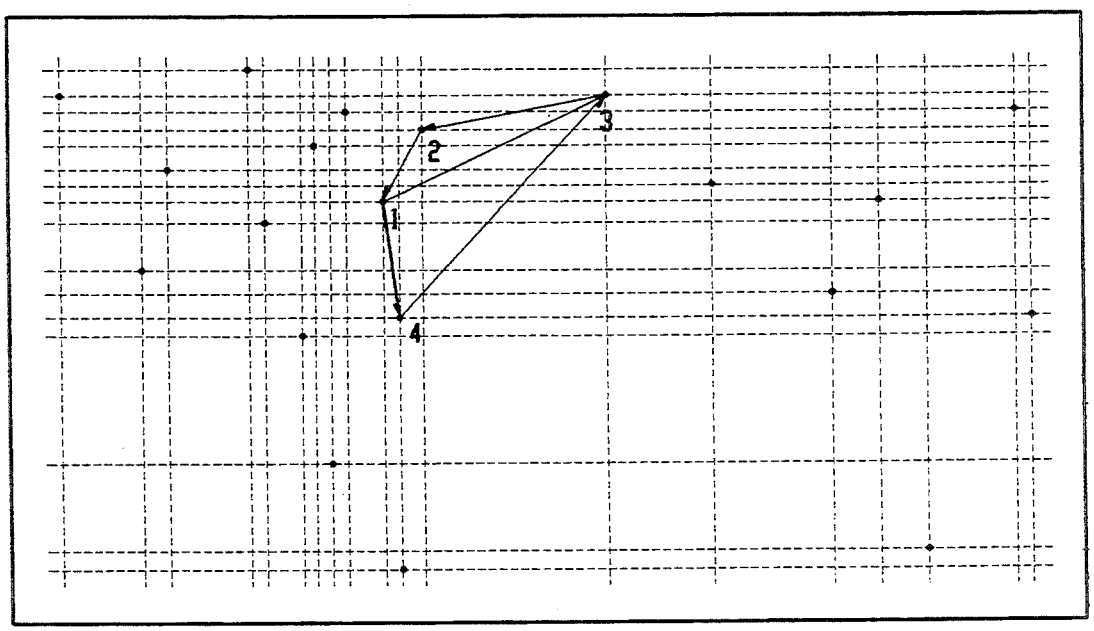
Figure 8:
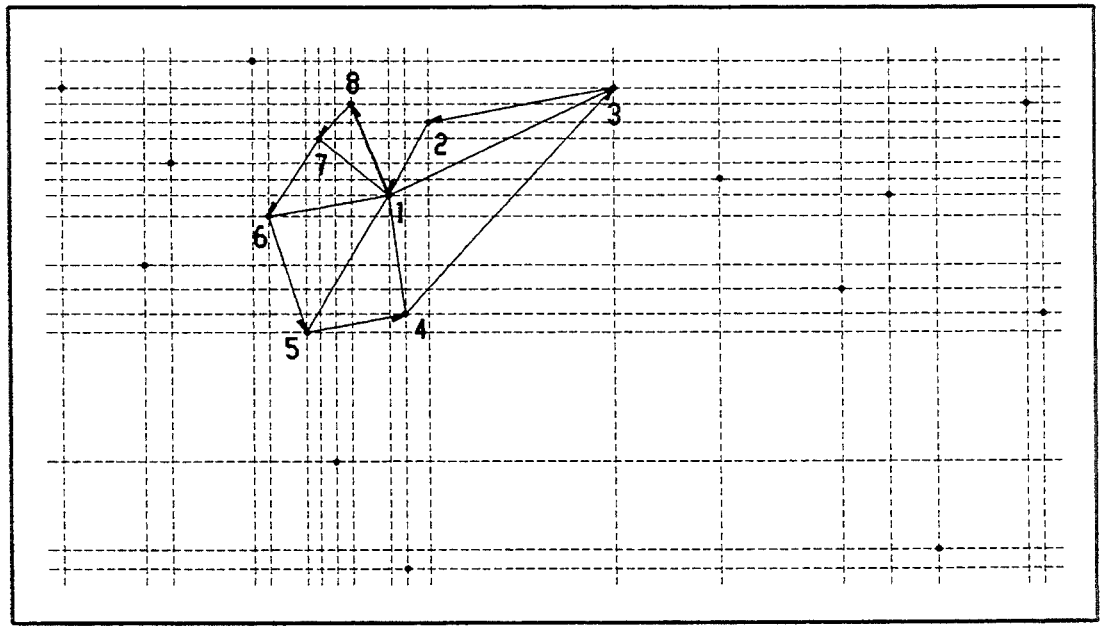
Figure 9:
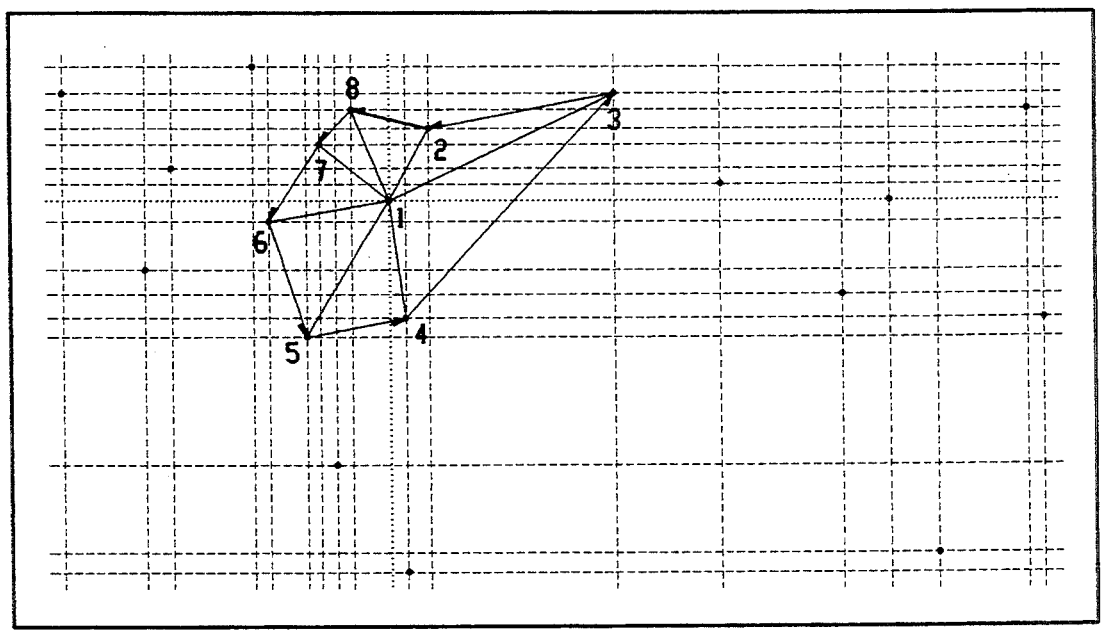
Figure 10:
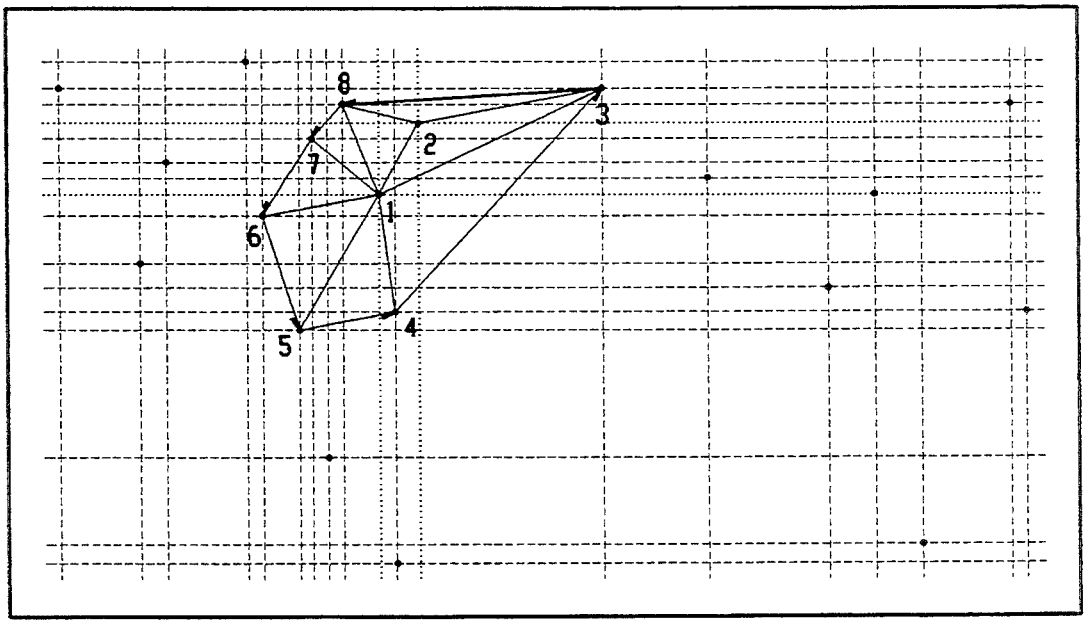
Figure 11:
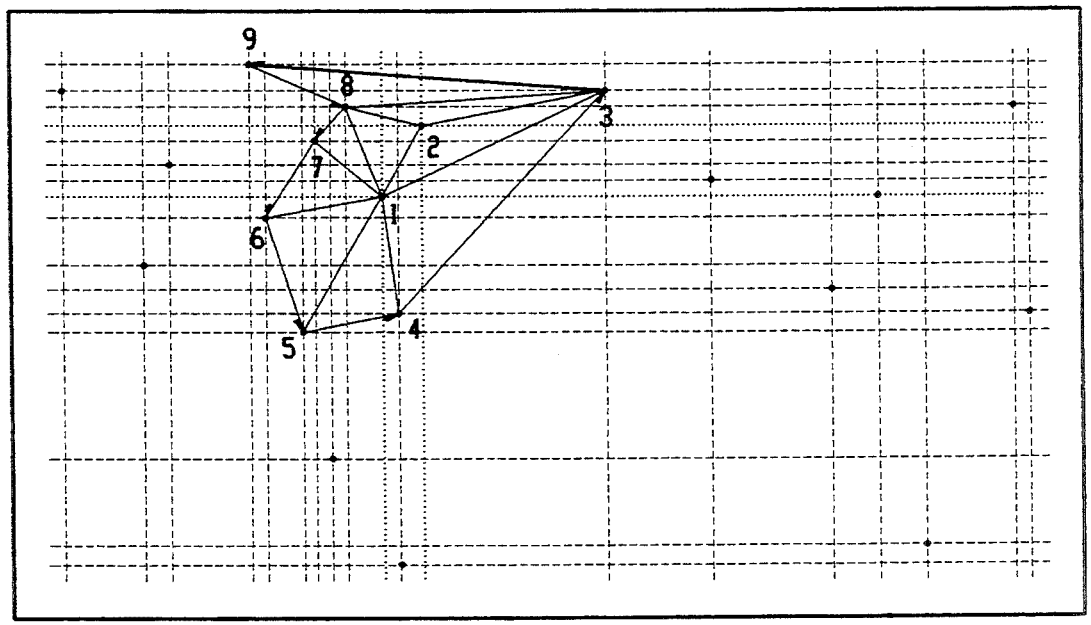
Figure 12:
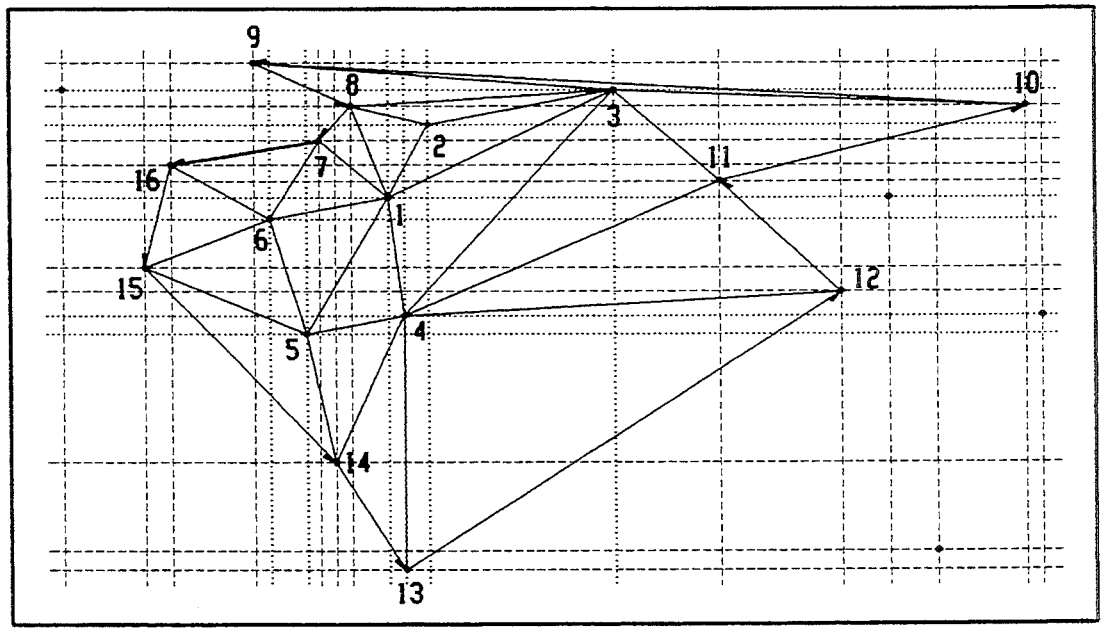
Figure 13:
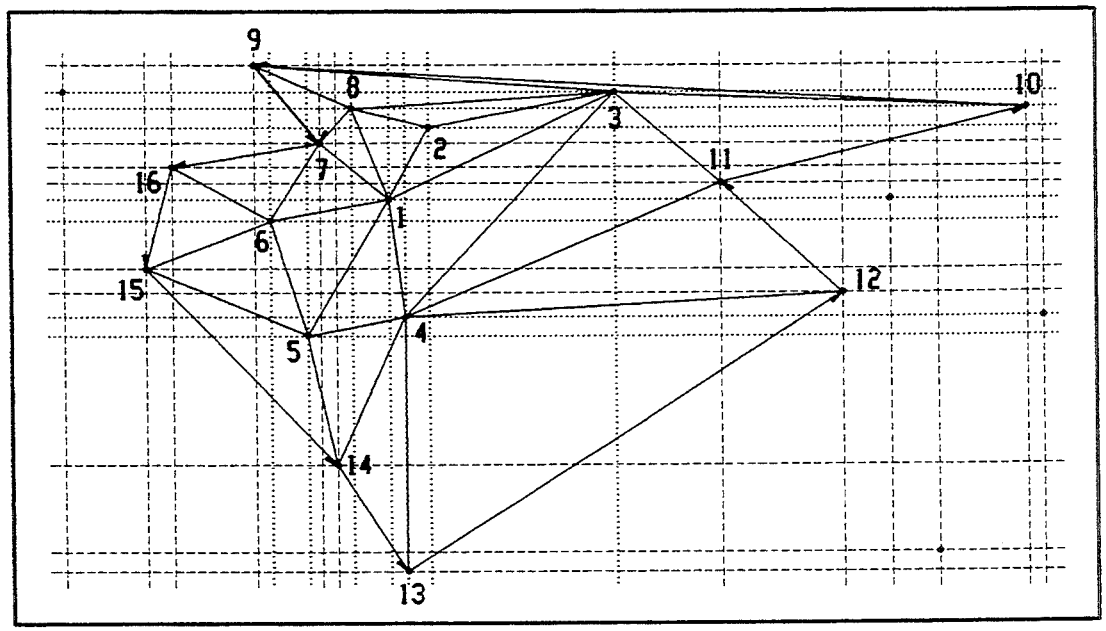
Figure 14:
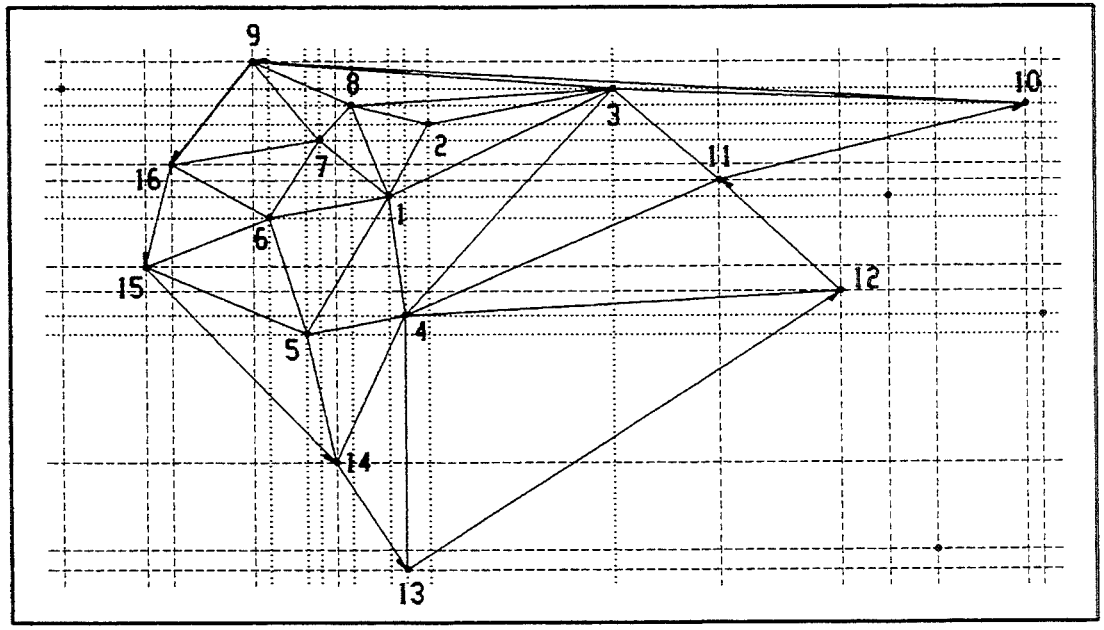
Figure 15:
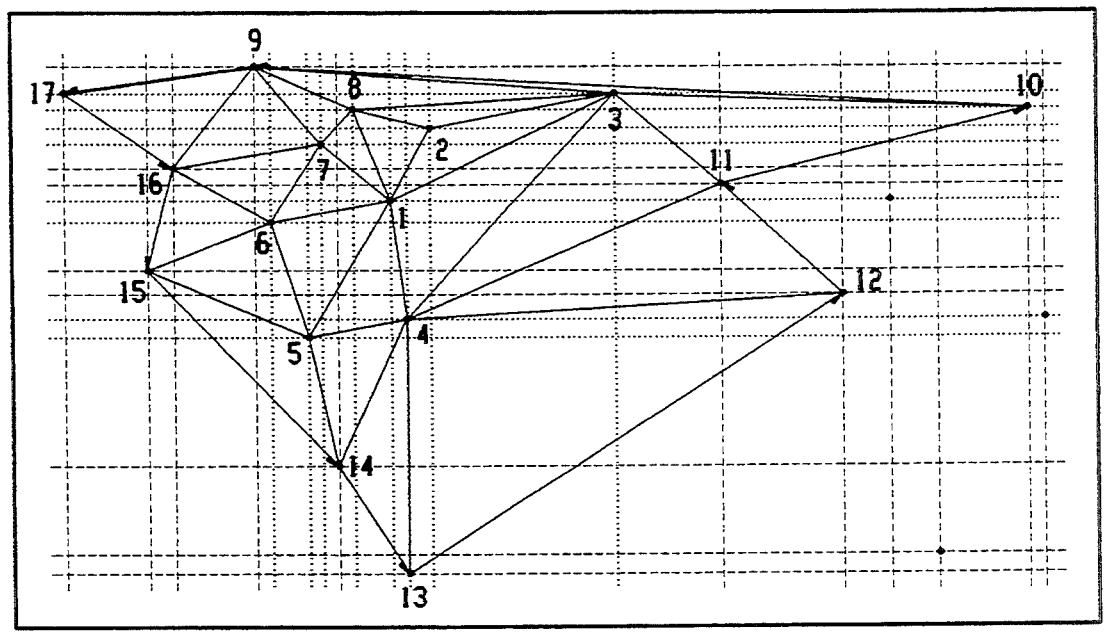
Figure 16:
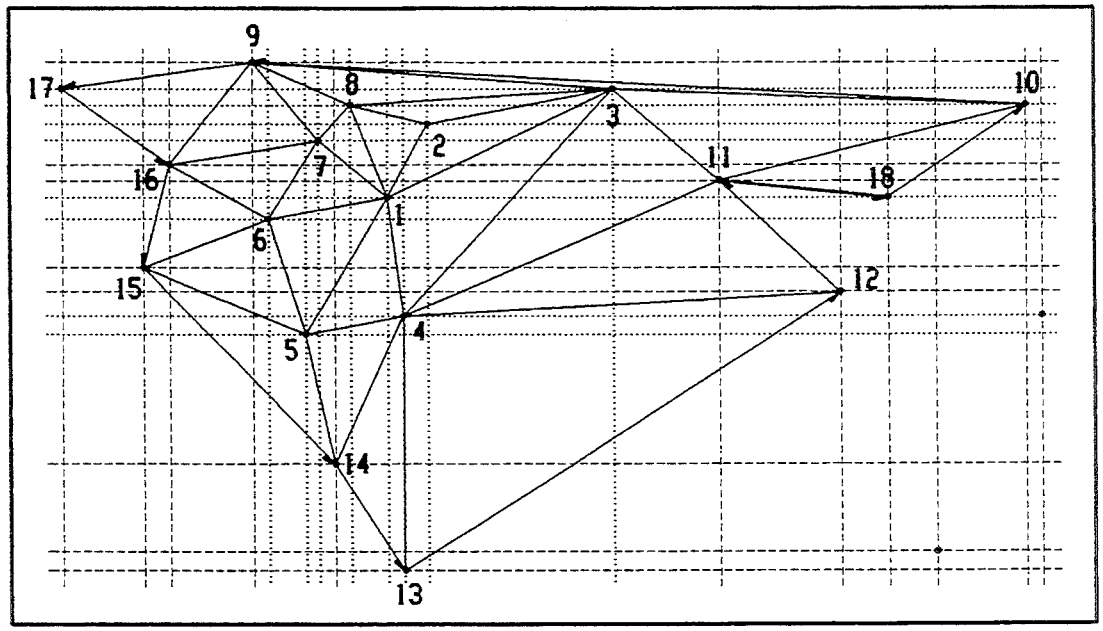
Figure 17:
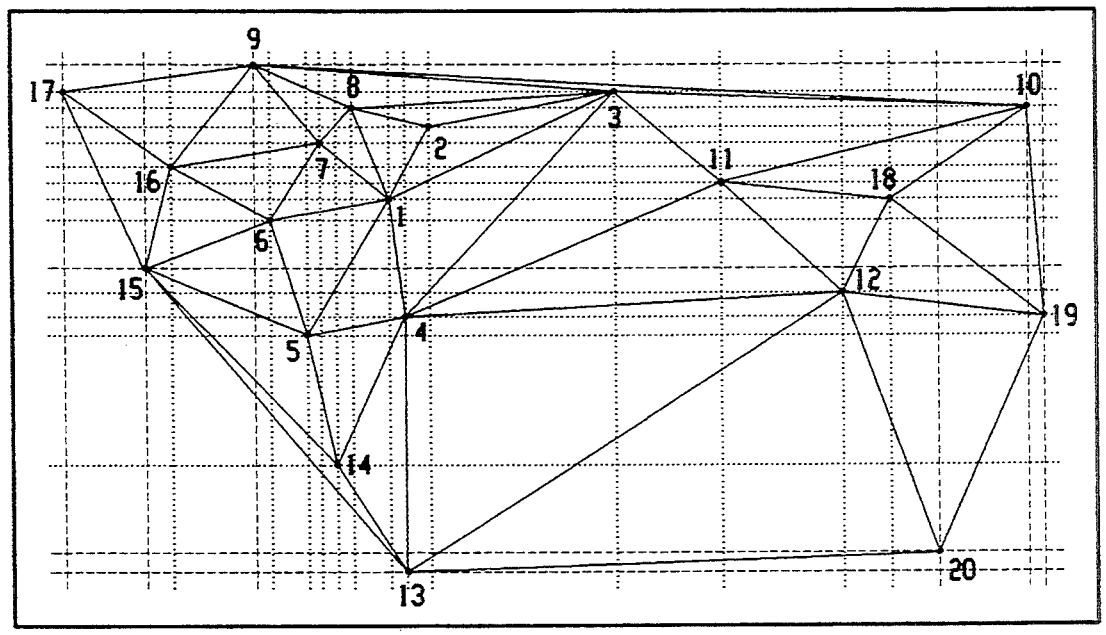
Figure 18:
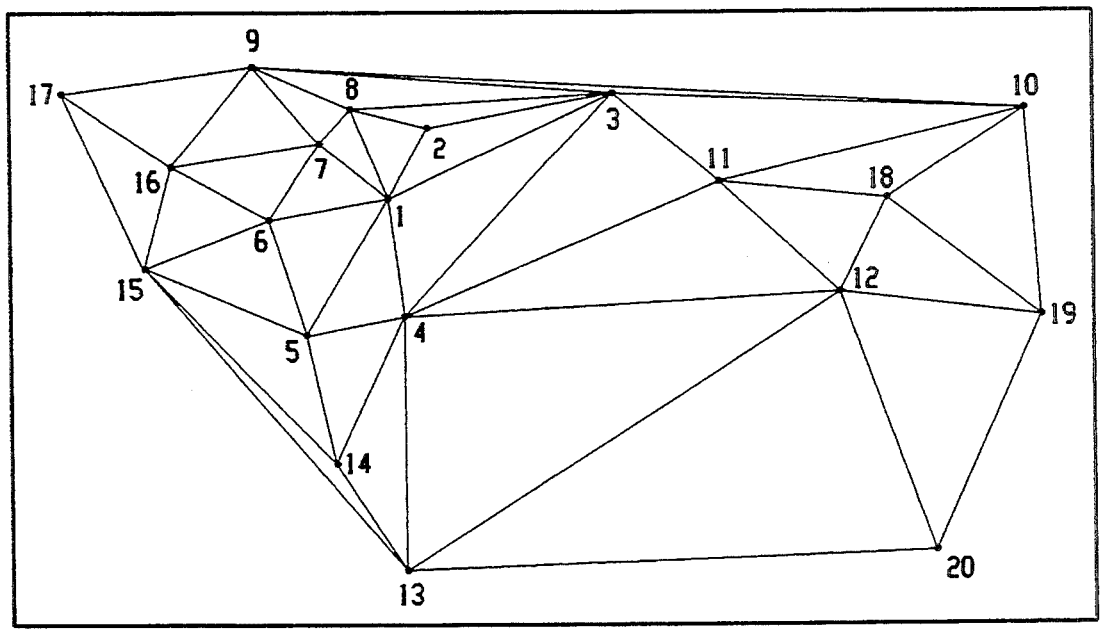
Figure 19A:
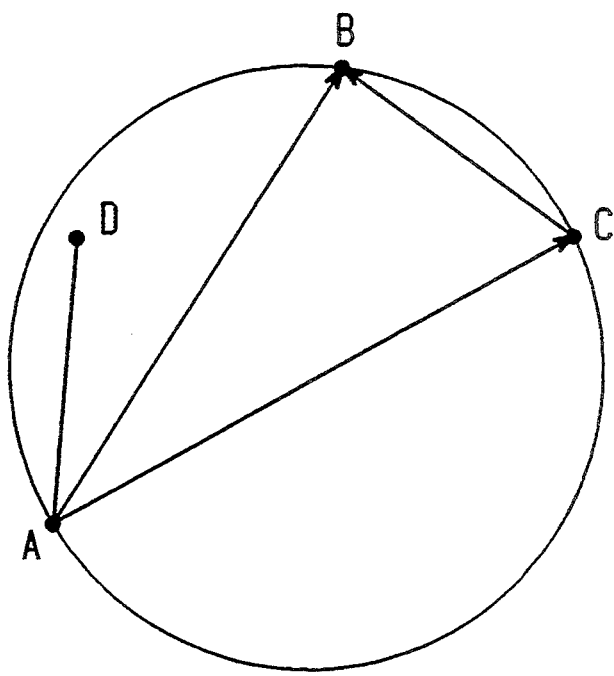
Figure 19B:
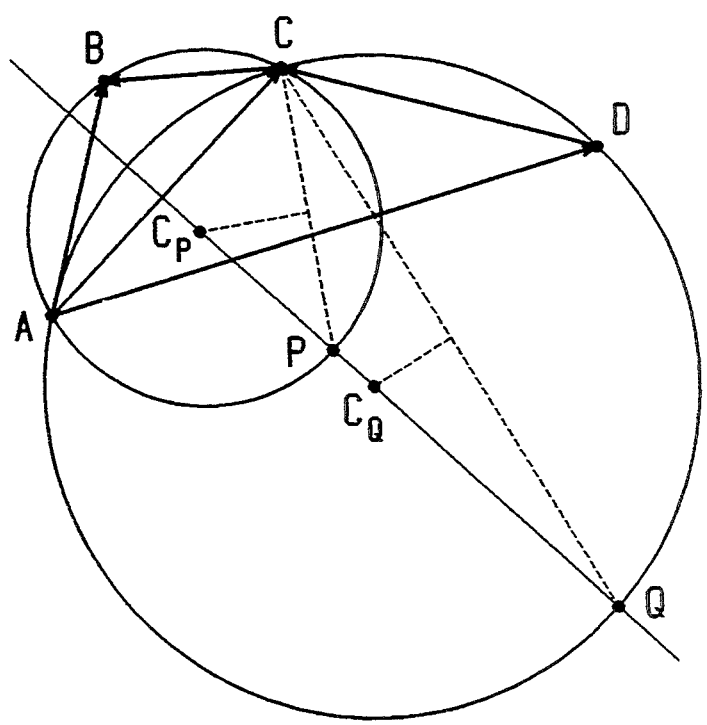
Figure 27:
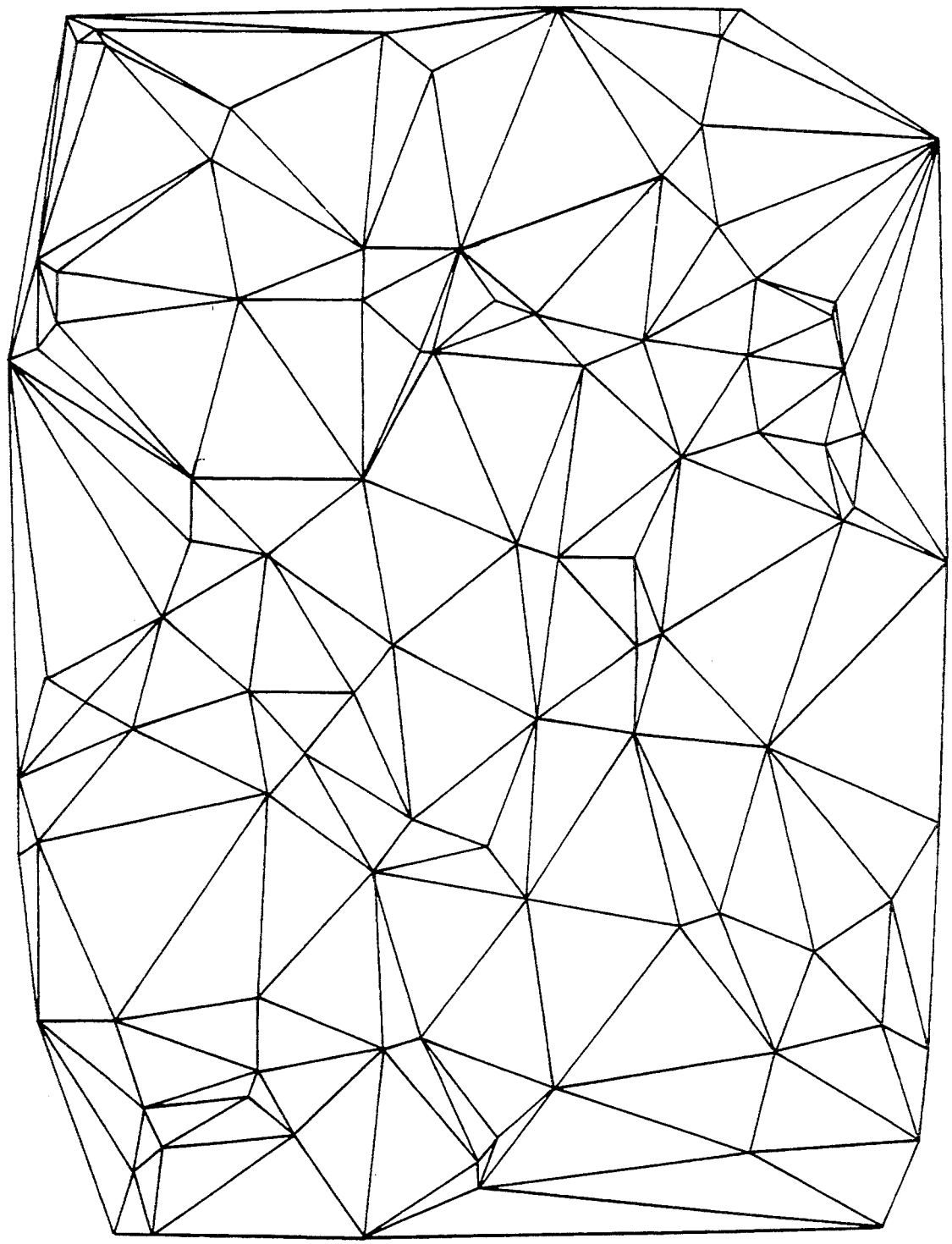
Figure 28:
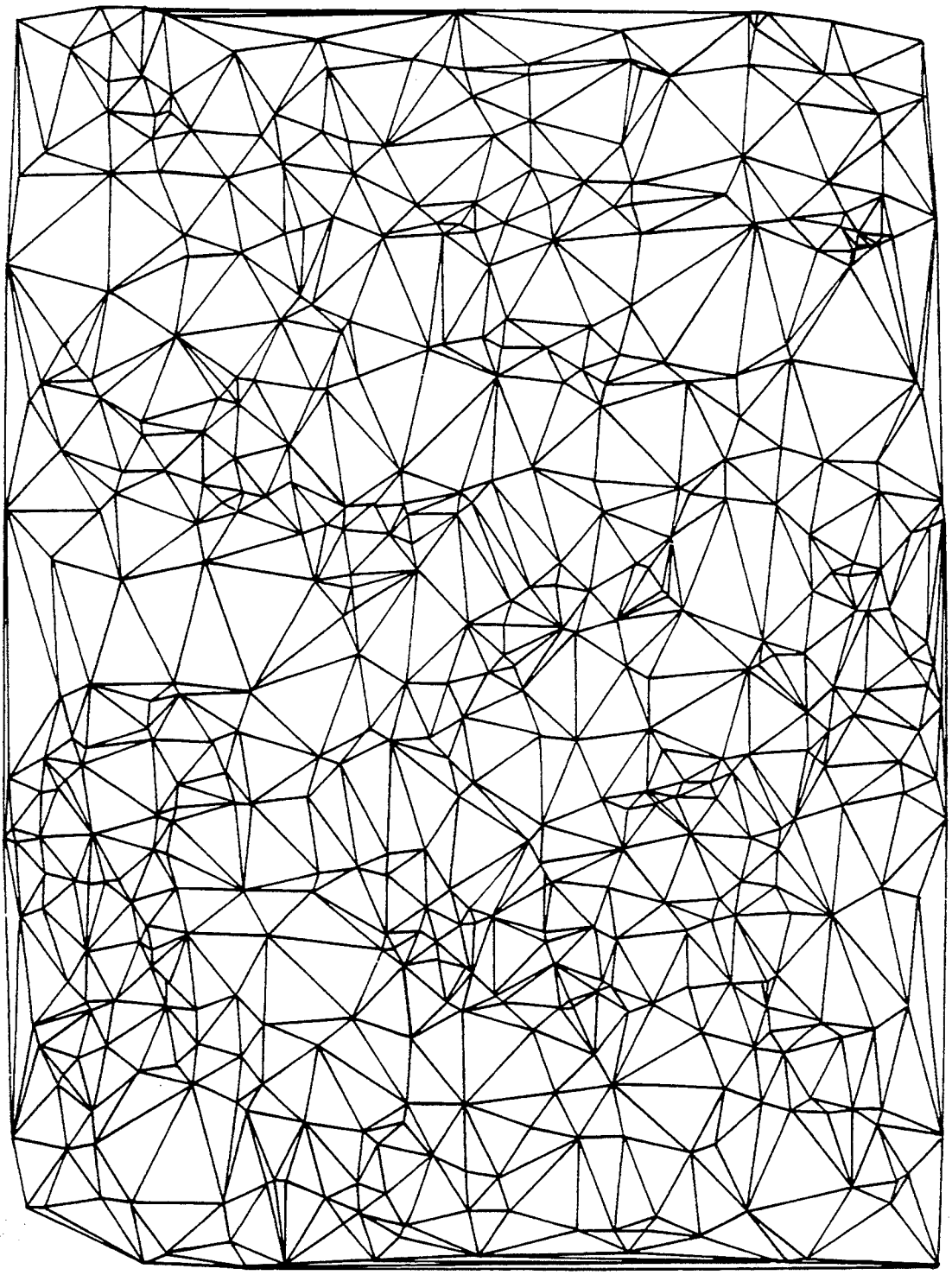
Figure 29:
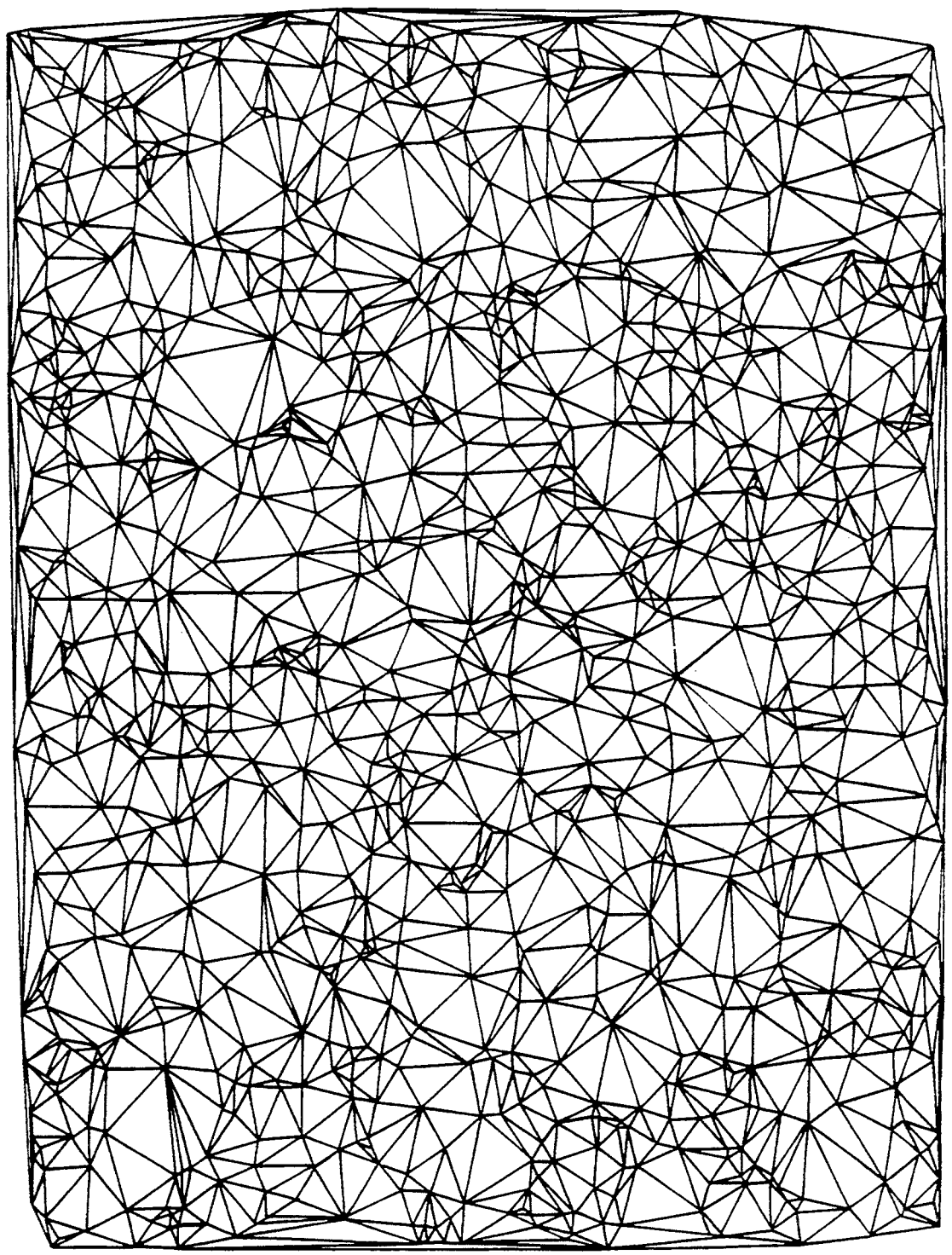
Figure 30:
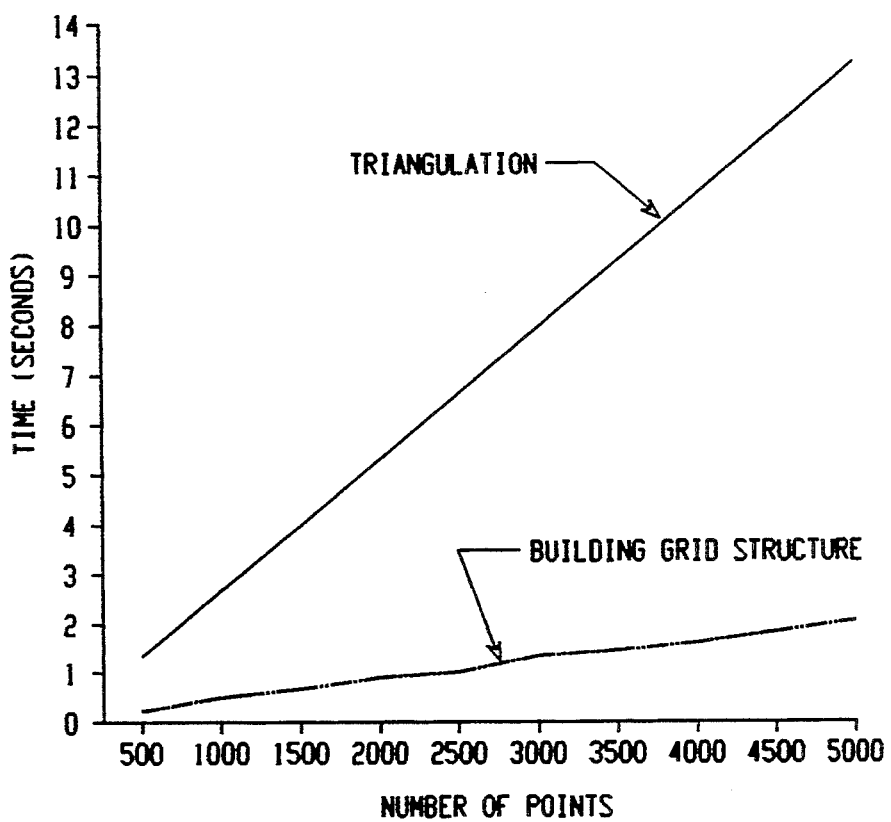
Figure 31:
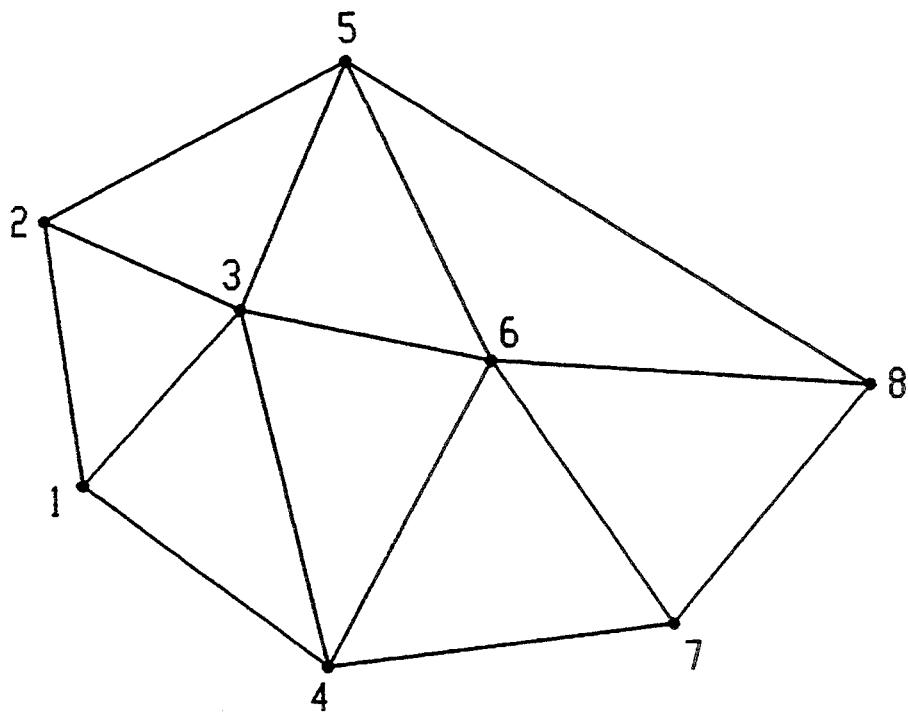

FIG. 3A1 is a schematic representation of subsequent steps in the triangulation process of the sparse matrix wherein the additional points of the triangle are determined;

FIG. 3A2 is a schematic representation of a method for finding half boxes for the sparse matrix;

FIG. 3B1 is a schematic representation of a first step in the procedure to find the first edge of a triangle in the uniform grid data structure;

FIG. 3B2 is a schematic representation of subsequent steps in the procedure to determine the subsequent edges of a triangle in the uniform grid data structure;

FIG. 3B3 is a schematic representation of the first point and first circle computed in the triangulation strategy;

FIG. 3B4 is a schematic representation of a subsequent point computed in the triangulation strategy and the bounding box updated;

FIG. 4 is a schematic representation of test data used in the present invention;

FIG. 5 is a schematic representation of a first step for finding the first edge of a triangle for the test data of FIG. 4;

FIG. 6 is a subsequent step an the triangulation strategy illustrating a first triangle generated;

FIG. 7 is a subsequent step an the triangulation strategy illustrating a second triangle generated;

FIG. 8 is a subsequent step an the triangulation strategy illustrating a configuration before the triangulation closes;

FIG. 9 is a subsequent step an the triangulation strategy illustrating a point being removed from the data set;

FIG. 10 is a subsequent step an the triangulation strategy illustrating a second point being deleted from the data set;

FIG. 11 is a subsequent step an the triangulation strategy illustrating an additional triangle being created;

FIG. 12 is a subsequent step an the triangulation strategy illustrating a triangular configuration showing the cave condition;

FIG. 13 is a subsequent step an the triangulation strategy illustrating a half edge skipped;

FIG. 14 is a subsequent step an the triangulation strategy illustrating a left touch condition;

FIG. 15 is a subsequent step an the triangulation strategy illustrating a boundary edge;

FIG. 16 is a subsequent step an the triangulation strategy illustrating a triangle formed with an unused point;

FIG. 17 is a subsequent step an the triangulation strategy illustrating the complete triangulation of the data points;

FIG. 18 is a schematic illustration of the complete triangulation of FIG. 17 shown without the rows and columns;

FIGS. 19A and 19B are schematic representations of the verification of the Delaunay criterion for the triangulation strategy;

FIGS. 20-26 are schematic representations of complete triangulation of data structures in a sparse matrix using data sets having 200, 600, 1,000, 13, 14, 302 and 347 points, respectively;

FIGS. 27-29 are schematic representations of complete triangulation of data structures in a uniform grid using data sets having 100, 500 and 1,000 points, respectively;

FIG. 30 is a graphical representation of the time complexity of the triangulation using a uniform grid; and FIG. 31 is a schematic representation of the triangular network to illustrate the output data structure used.

DETAILED DESCRIPTION OF THE PREFERRED EMBODIMENTS

Figure 1B:
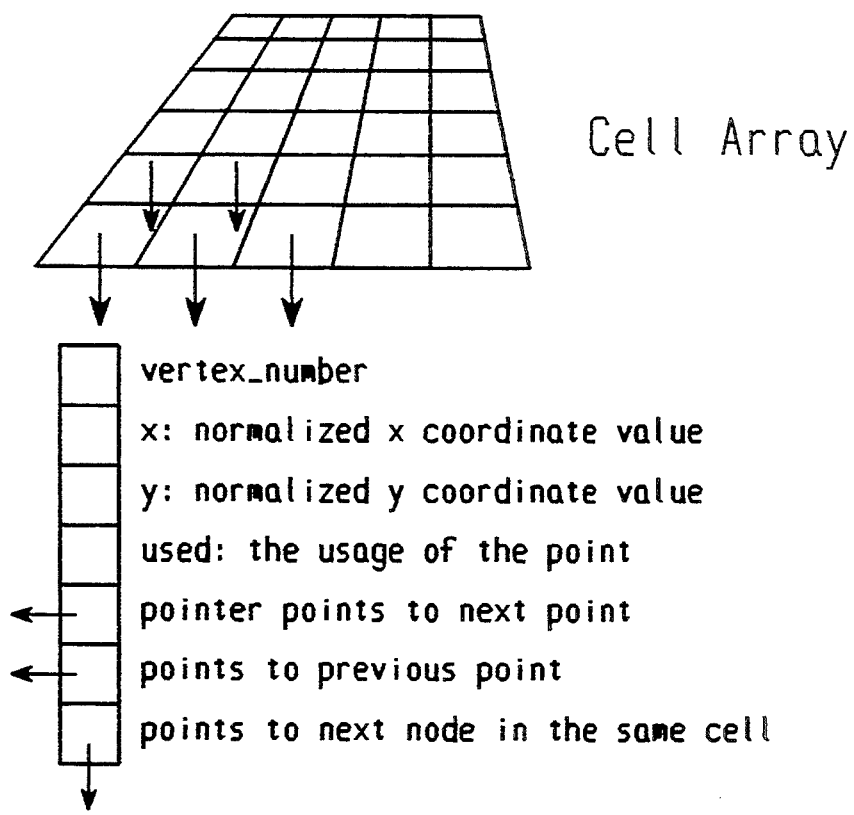
FIG. 1B is a schematic representation of the data structure used in the triangulation process for a uniform grid according to a second embodiment of the present invention.

Referring to the drawings and initially to FIGS. 1A and 1B, a data structure is illustrated which provides data in sufficient form such that a triangulation strategy can be implemented. The triangulation strategy transforms raw data into a triangulated irregular network (TIN) for, e.g., digital terrain modelling or other mathematical calculations.

According to one embodiment of the present invention, the data is first pre-processed using sorting techniques, put into a sparse matrix, and a triangulation strategy is used to produce complete triangulation of the data. According to another embodiment of the present invention, the data is preprocessed into a uniform grid structure and then the triangulation strategy is used to produce complete triangulation of the data.

1. Preprocessing of Data

Assume a set of random points in 2-Dimensions:

$$(x_i, y_i), i=0 \ldots n.$$

These data points are put into a data structure so that range searching, which is necessary to find triangular points (as will be described hereinbelow), becomes easy. More precisely, given an edge $<a,b>$, a point "c" is found such that the triangle $<a,b,c>$ is a candidate to form a Delaunay triangle (the Delaunay triangle has the property that its circumscribing circle does not contain any other point).

A. Sparse Matrix

According to the first embodiment of the invention, the data structure is a sparse matrix structure that requires sorting of the data set in the x- as well as in the y-directions. Sorting can be done in a variety of ways well documented in textbooks and known to those skilled in the art. See R. Sedgewick, Algorithms in C, Addison-Wesley, Reading, Mass., 1990; G. H. Gonnet and R. Baeza-Yates, Handbook of Algorithms and Data Structures in Pascal and C, Addison-Wesley, Reading, Mass., 1991; A. M. Tenenbaum, Y. Langsam and M. J. Augenstein, Data Structures using C, Prentice Hall, Englewood Cliffs, N.J., 1990; and T. H. Cormen, C. E. Leiserson and R. L. Rivest, Introduction to Algorithms, The MIT Press, Cambridge, Mass., 1990. Preferably, the sorting technique is a quicksort technique shown in L. Ammeraal, *Programs and Data Structures in C*, John Wiley & Sons, New York, N.Y., 1987.

The sorting process generally works according to the following psuedocode:

```
void qsort (LIST *1, int left, int right)
{
    int p=left, q=right;
    double mid;
    do
    {
        mid ← middle element of the list;
        do
        {
            while(list value at p < mid) p++;
            while(list value at q > mid) q--;
            if(p > q) break;
            exchange records at positions p and q;
        } while(++p < = --q);
```

-continued

```
        if(q-left < right-p)
        {
            if(left<q) qsort(1, left, q);
            left ← p; q ← right;
        } else
        {
            if(p<right) qsort(1, p, right);
            right ← q; p ← left;
        }
    } while(left < right);
}
``` where LIST declares a structure of different elements needed for the triangulation. For a sample of 1,000 random points, the two sortings (x- and y-directions) takes less than half a second.

After the sorting is done, a sparse matrix structure is built, as will be described in the following sections.

B. Uniform Grid

According to the second embodiment of the present invention, the data structure used in the algorithm is a uniform grid structure laid over the data points. The uniform grid is computed as follows. First, the min-max box of the data set is determined. Second, the box is offset outwards by the point coincidence tolerance TOL, that is, the following bounds are computed:

xmin = xmin − TOL
xmax = xmax + TOL
ymin = ymin − TOL
ymax = ymax + TOL.

These steps are necessary to resolve the conflict if points lie on grid lines. Next, the grid size is computed as follows:

$$size = \left( \frac{(xmax - xmin)(ymax - ymin)}{n} \right)^{\frac{1}{2}}$$

This choice of the grid size results in the following number of grid cells in x- and y-directions (the x- and y-resolutions of the 2-D domain):

$$x\text{-res} = int\left( \frac{xmax - xmin}{size} \right) + 1$$

$$y\text{-res} = int\left( \frac{ymax - ymin}{size} \right) + 1,$$

where int() is the cast operator that converts a double precision number into an integer.

After the grid structure has been computed, each data point is put into one and only one grid cell. For each point $(x_i, y_i)$, $i = 0, \ldots, n$, do the following:

1. Compute $$grid\_x = \frac{x_i - xmin}{size}$$

$$grid\_y = \frac{y_i - ymin}{size}$$

i_cell = int(grid − x)
j_cell = int(grid − y).

Note that grid_x and grid_y are coordinates normalized with respect to the origin (xmin,xmax).

2. If the cell at the index (i_cell, j_cell) is empty, then put $(x_i, y_i)$ into it.
3. If the above cell has already points in it, then check for point coincidence. If the current point coincides with any of the points already in the cell, then ignore this point. Otherwise, put it in the cell.

The above process associates each data point with one and only one cell. This is true even for points that lie along the lines or at corners of the grid structure. Since xmin and ymin were offset by TOL, if points lie on grid lines, then the grid to the right of the vertical line and above the horizontal line is chosen. If points lie along the right or along the top side of the min-max box, then since xmax and ymax were also offset, the cell immediately left or below the grid line is considered.

2. Data Structures

A. Sparse Matrix

The data structure used an the first embodiment of the triangulation process is illustrated in FIG. 1A. The points are put in a sparse matrix where each x- and y-value is associated with the following record:

```
struct xynode
{
    double x_value;
    int number_of_points;
    LIST ptr;
}
``` where ptr is a pointer pointing to the following list:

```
struct vnode
{
    int index;
    int used;
    POINT previous, next;
    struct vnode *next;
}
typedef struct vnode *LIST;
```

The variable index is the index of the point in the original data set. The flag used is applied to distinguish those points that have been used to form triangles. Records previous and next are simply pairs of indexes in the form:

```
struct pnode
{
    int i, j;
}
typedef struct pnode POINT;
``` and are used during the triangulation process as illustrated in FIG. 1A. Finally, the pointer next points to the next node, i.e., all the points that lie on the same column in the sparse matrix are linked together in a list whose head pointer is in the x-value structure. Fortunately, this structure does not need to be maintained in both x- and y-directions. It is sufficient to maintain the head structure and a link lists of indexes of points that lie on the same row only in the y-direction. The variables used, previous and next belong to each point in the data set and hence need to be stored only once.

B. Uniform Grid

According to the second embodiment of the invention, the data is put directly into a uniform grid for the triangulation process, hence no initial sorting is necessary. The data structure is a two-dimensional matrix of pointers each pointing to a linked list of points that fall into the same cell (see FIG. 1B). Each data point is associated with the following structure:

```
struct cellnode
{
    int vertex_number;
    double x, y;
    int used;
    struct cellnode *previous_point;
    struct cellnode *next_point;
    struct celluode *next_node;
}
```

The explanations of the different variables are as follows:

vertex_number is a number between 0 and n, x and y are the normalized coordinates of the point, used is a flag that shows if a point was used to form a triangle or not, previous_point and next_point are pointers incorporating a certain ordering into the triangulation process (see details below), and next_node simply points to the next node associated with the same cell.

3. Finding Initial and Triangular Points

The triangulation process consists of three major steps:

1. finding a first point and the first edge,
2. forming triangles, and
3. putting triangles together.

In the sections that follow each step is explained in detail.

A. Sparse Matrix

To determine the first point and edge, the algorithm starts in the middle of the data set. In the first embodiment of the invention, the following indexes are computed:

$$(^i test, ^j test) \leftarrow (max\_xindex/2, max\_yindex/2).$$

If no point is found at this position in the sparse matrix, then the nearest point is searched for. The algorithm to find the nearest point is as follows (see FIG. 2A):

1. If the test indexes belong to a point, then done.
2. Otherwise, set the minimum distance $d_{min}$ to a large number.
3. Draw a box around the point ($^i test, ^j test$), compute the shortest distance $d_{shortest}$ to the sides of the box.
4. If $d_{shortest}$ is less than $d_{min}$, then check the columns and the rows. If points are found, compute the minimum distance.
5. Keep enlarging the box until the shortest distance to the sides is not less than the minimum distance.

After the starting point "A" is found, FIG. 3A1, the algorithm is called again to find the nearest point "B" to "A" to form the first edge of the triangulation. This first edge is then passed on to the triangulation routine that adds a third point "C" to each edge to form a triangle. The algorithm that finds a third point "C" to form the triangle ABC is as follows, FIG. 3A1:

1. Find point T, the intersection of the horizontal and vertical lines emanating from A and B.
2. Search for points inside the triangle ATB.
3. If points are found, then select the one for which the cosine of the angle $\angle (AP_iB)$ is the smallest (i.e., that which gives the largest angle) where $P_i$ is a variable point.
4. If not, then search the row AT and the column TB. If no points are found, then check rows and columns $A_1T_1$ and $T_1B_1$, $A_2T_2$ and $T_2B_2$ etc.
5. After points are found, draw circles through A, B and the found points, and find the one that has the smallest circle.
6. set the bounding box of the smallest circle and continue the search until the next row and column do not exceed the box limits, and do the following:
   (a) Check for points inside the box.
   (b) If points are found, then get the smallest circle.
   (c) If the smallest circle is smaller than the current one, then update the box and go to step (a).

B. Uniform Grid

Similarly, with respect to the second embodiment of the invention, the following algorithm is used to determine the first point and edge in the uniform grid (see FIG. 2B):

1. Find the middle cell at the cell index $$(m,n) = (x\_res/2, y\_res/2);$$

2. If the cell at (m, n) is not empty, then pick any point (the top element of the linked list);
3. If the cell is empty, then search the neighboring cells. This can be done in a variety of ways. For example, the top 3 cells can be initially searched, then the bottom 3 cells, and finally the left and the right cells. As soon as a point is found, the search is stopped. If no points are found, then the search continues by searching the top 5 cells, the bottom 5 cells, the left 3 and the right 3 cells, etc.

This algorithm is rather simple and is a good starting point which is somewhat off the physical center of the data set to give the same performance as the one that is the closest to the center. However, a difference could arise if a point was chosen close to one of the boundaries of the min-max box rather than one close to the center.

After the initial point $P_1$ is picked, the first edge is computed by finding the nearest point to it. This is done as follows (see FIG. 3B1):

1. Set the minimum distance $d_{min}$ to a large number, e.g., the diagonal of the min-max box.
2. If there is more than one point in the cell with the initial point, then find the point in the cell that is the closest to $P_1$ and compute the distance d between the two points. If d is less than $d_{min}$, then set $d_{min}$ to d.
3. Search rows and columns around the cell just as in the previous algorithm, i.e., search the top 3 cells, the bottom 3 cells, the left and the right cell. Then search the top 5 cells, the bottom 5 cells, the left 3 and the right 3 cells, etc.
4. For each row and column do the following:
   (a) Drop a perpendicular from $P_1$ to the side that is closest to $P_1$.
   (b) If the length of the perpendicular is less than $d_{min}$, then search the row/column. If not, mark the direction (top row, bottom row, left column and right column) as invalid.
   (c) If points are found, compute the distance from $P_1$ and update $d_{min}$ if distance happens to be less than the current minimum.
5. The search stops when all directions are marked invalid, i.e., all points in unsearched rows and columns are farther from $P_1$ than the one used to compute $d_{min}$.

The found point $P_2$ is the closet point to $P_1$, and the edge $<P_1, P_2>$ is the first edge that is used to start the triangulation.

Assume that the edge $<P_1,P_2>$ is found (see FIG. 3B2). A third point $P_i$ is sought such that the triangle $<P_1,P_i,P_2>$ satisfies the Delaunay criterion, i.e., its circumscribing circle does not contain any other point from the data set. The algorithm that finds a third point is as follows:

1. Search on the right hand side of $P_1P_2$.
2. Find the cells with indexes $(i_1, j_1)$ and $(i_2, j_2)$ that are either the cells of the end points or their immediate neighbors. These cells can contain points that are on the right hand side of $P_1 P_2$. The index $i_1$ is computed by intersecting the bottom line of the cell containing $P_1$ with $P_1 P_2$ and finding the column index of the cell the intersection point falls in (see FIG. 3B2). The index $j_2$ is computed similarly using the grid line bounding the cell of $P_2$ from the right.
3. Form a triangular area covered by cells. The vertices of the cell-triangle are $(i_1, j_1)$, $(i_2, j_1)$ and $(i_2, j_2)$ and the boundaries are cells arranged horizontally, vertically and diagonally as illustrated in FIG. 3B2. In the diagonal direction, all cells that intersect the line $P_1 P_2$ are chosen. (The line-cell intersection is very efficient. Because of the uniform grid applied, it can be done by one addition, i.e., for each line computed the slope of the line and the first intersection and then each grid selection requires only one addition to move to the next intersection point).
4. After the triangular area is formed, each cell is checked inside the area. The search can be done in a variety of ways. Two examples are:
   (a) search each column starting at $(i_2, j_1)$ and move to the left until $(i_1, j_1)$ is reached (see FIG. 3B2), or
   (b) search $(i_2, j_1)$, then search diagonally by visiting $(i_2, j_1+1)$ and $(i_2-1, j_1)$, then $(i_2, j_1+2)$, $(i_2-1,j_1+1)$ and $(i_2-2, j_1)$, etc.

The point is to search the cell first that most likely provides the point that yields the triangle with the largest angle at the found point, and also which is as close to the equi-angular triangle as possible. Another consideration is to keep the searching strategy as simple as possible. In practical situations, the average number of cells to be visited is less than 10.

5. If points are found, then:
   (a) choose the one that gives the largest angle, i.e., the smallest cosine,
   (b) get the circle defined by $P_1$, $P_2$ and the point with the maximum cosine, and
   (c) set the min-max box of the circle (see FIG. 3B3), otherwise search rows from $(i_1-k, j_1-k)$ to $(i_2+k, j_1-k)$, and columns from $(i_2+k, j_1-k)$ to $(i_2+k,j_2+k)$, $k=1,2 \ldots$, until points are found.
6. After the first min-max box is set, continue searching along rows and columns inside the min-max box and perform the same technique as described above, i.e., select the point with the smallest cosine, draw the circle and update the min-max box (see FIG. 3B4).
7. The search stops when there are no unvisited rows and columns that are inside the current min-max box.

The dynamic update of the circle bounding box using the sparse matrix and uniform grid is an essential part of the algorithm as points close to the line AB (point E in FIG. 3A1) in the first embodiment, or points close to the line $P_1P_2$ in the second embodiment, can result in huge boxes that might lead to searching for triangular points on the entire data set. The main goal is to limit the search to the immediate vicinity of the edge AB so that points are found within a few steps.

If the edge AB or $P_1P_2$ happens to be horizontal or vertical, then the triangulation strategy cannot be applied. Instead, half boxes are used to search for candidate points (see FIG. 3A2). In this case, the same techniques disclosed above are applied using boxes rather than triangles, with the boxes expanding until the points are found within a few steps.

4. The Triangulation Strategy

The most intriguing question is how to put triangles together to ensure that the triangulation is complete and correct. A good way to ensure completeness is to start somewhere, find the first triangle, and then add triangles successively so that the added triangles are simply connected, i.e., there are no holes and bridges with the already chosen triangles. The triangulation strategy adds triangles in a circular fashion and is best explained through a practical example. An exemplary data set of 20 survey data points for a sparse matrix is illustrated in FIG. 4. The dashed lines show the rows and the columns of the sparse matrix. In the figures that follow, several important tools of the triangulation are illustrated. The same strategy applies to the grid-based method.

With respect to either embodiment described above, FIG. 5 shows the first step, that is, finding the first edge as detailed in the previous section. This edge is subdivided in half and the two half edges $P_1P_2$ and $P_2P_1$ (or $A_2B_1$ and $A_1B_2$) are put into an edge list that is actually a circular queue. This circular queue is used throughout the triangulation process to keep track of the current edge to be used to find the next triangle. The current content of the queue is:

$$P_2P_1, P_1P_2$$
front rear where the current edge is always at the rear of the queue. With the current edge $P_1P_2$ the point $P_3$ is found, and two new half edges $P_3P_2$ and $P_1P_3$ are created, FIG. 6. Since the half edge $P_1P_2$ is not used any more, it is deleted from the queue and the two new half edges are added to its rear. The edge list then looks like this:

$$P_2P_1, P_3P_2, P_1P_3$$
front        rear

The current half edge is $P_1P_3$ and is used to find the point $P_4$, and the half edges $P_4P_3$ and $P_1P_4$, FIG. 7. After deleting the current edge and adding the new half edges, the edge list is:

$$P_2P_1, P_3P_2, P_4P_3, P_1P_4$$
front              rear

Continuing this process, i.e., using the current half edge to create two new half edges and updating the edge list, the first important configuration is depicted in FIG. 8. Here the edge list is:

$$P_2P_1, P_3P_2, P_4P_3, P_5P_4, P_6P_5, P_7P_6, P_8P_7, P_1P_8$$
front                                                                 rear With the current edge $P_1P_8$ the point $P_2$ is found and two new half edges $P_2P_8$ and $P_1P_2$ are created. Notice that the half edge $P_1P_2$ is the dual of the half edge $P_2P_1$ that is at the front of the edge list. Since both half edges have been processed, they can be eliminated from the edge list. The new edge list is then, FIG. 9.

$$P_3P_2, P_4P_3, P_5P_4, P_6P_5, P_7P_6, P_8P_7, P_2P_8$$
front                                                      rear The situation where a found half edge is the dual of the one at the front of the edge list is called a right touch. A left touch is a situation where the found half edge is the dual of the one before the rear edge in the edge list (see an example below). A touch situation occurs when the found triangular point was used before. Therefore, each point that is found in the first time is flagged as a used point, and if used points are found then the algorithm checks for touch cases. Otherwise, no touch check is necessary.

Further, investigating FIG. 9, it is clear that point $P_1$ is not needed any more, and therefore this point can be eliminated from the sparse matrix or uniform grid. This step is essential as it decreases the time it takes to find triangular points (see FIG. 3A2 or FIG. 3B4).

As detailed above, rows and columns are checked to look for candidate points to form a triangle. More particularly, even if the data point lies above or below the edge, its column and row might have to be checked if it crosses the triangular domain shown in FIG. 3A1. However, if points, and hence rows and columns, are deleted, then the algorithm has to check against less rows and columns. Of course, if points lie on the same row or column, then the row or column will not disappear until all the points that lie on the same row/column are deleted. Also notice that a point can be deleted whenever a touch (left or right) occurs.

Referring now to FIG. 10, the edge $P_2P_8$ was used and the point $P_3$ was found. Notice that when searching for $P_3$, the column dotted in FIG. 9 did not need to be considered. Also, when searching for a triangular point with the edge $P_3P_8$ in FIG. 10, the complexity is decreased by two columns and the point $P_9$ is found faster, FIG. 11.

The next important stage of the triangulation strategy is shown in FIG. 12. The edge list is as follows:

$$P_8P_7, P_9P_8, P_{10}P_9, P_{11}P_{10}, P_{12}P_{11}, P_{13}P_{12}, P_{14}P_{13}, P_{15}P_{14}, P_{16}P_{15}, P_7P_{16}$$
front                                                                                                                   rear With the rear edge the point $P_9$ is found. Since $P_9$ is a used point, the algorithm checks for touch cases. Unfortunately, no touch is found with either the front edge or with the one before the rear edge. This case is remedied by skipping the edge $P_9P_7$ and moving the front edge to the rear. With this the edge list is:

$$P_9P_8, P_{10}P_9, P_{11}P_{10}, P_{12}P_{11}, P_{13}P_{12}, P_{14}P_{13}, P_{15}P_{14}, P_{16}P_{15}, P_7P_{16}, P_8P_7$$
front                                                                                                                   rear With $P_8P_7$ the point $P_9$ is found and two new half edges $P_8P_9$ and $P_9P_7$ are created. Since $P_9$ has the flag used, the algorithm checks for touch cases. A right touch is found with the front edge $P_9P_8$, and therefore the point $P_8$ is deleted from the data set, and the half edges $P_8P_7$ and $P_9P_8$ are deleted from the edge list. The new edge list corresponding to the triangulation in FIG. 13 looks like this:

$$P_{10}P_9, P_{11}P_{10}, P_{12}P_{11}, P_{13}P_{12}, P_{14}P_{13}, P_{15}P_{14}, P_{16}P_{15}, P_7P_{16}, P_9P_7$$
front                                                                                                             rear Using the current edge in the list, the point $P_{16}$ is found and new half edges $P_9P_{16}$ and $P_{16}P_7$ are generated. Since $P_{16}$ is used, touch case is checked. Although no right touch is found with the front edge, a left touch is detected with the one before the rear edge ($P_7P_{16}$). This edge along with the current rear one are removed from the list and the newly created one $P_9P_{16}$ is added to the rear. The new edge list corresponding to the configuration in FIG. 14 is as follows:

$$P_{10}P_9, P_{11}P_{10}, P_{12}P_{11}, P_{13}P_{12}, P_{14}P_{13}, P_{15}P_{14}, P_{16}P_{15}, P_9P_{16}$$
front                                                                                                 rear With $P_9P_{16}$ the point $P_{17}$ is found. Since this point does not have the used flag, no touch situation is checked and the new half edges $P_{17}P_{16}$, $P_9P_{17}$ are added to the rear of the list after removing $P_9P_{16}$. The edge list corresponding to FIG. 15 is:

$$P_{10}P_9, P_{11}P_{10}, P_{12}P_{11}, P_{13}P_{12}, P_{14}P_{13}, P_{15}P_{14}, P_{16}P_{15}, P_{17}P_{16}, P_9P_{17}$$
front                                                                                                              rear Using the front edge $P_9P_{17}$, no point is found. Such an edge is a boundary edge and it is deleted from the edge list, and is moved to the rear. The new edge list becomes $$P_{11}P_{10}, P_{12}P_{11}, P_{13}P_{12}, P_{14}P_{13}, P_{15}P_{14}, P_{16}P_{15}, P_{17}P_{16}, P_{10}P_9$$
front                                                                                              rear The half edge $P_{10}P_9$ is again a boundary edge and is deleted from the list and the front one is moved to the rear. Now, using $P_{11}P_{10}$ the unused point $P_{18}$ is found and the new half edges $P_{18}P_{10}$ and $P_{11}P_{18}$ are generated resulting in the edge list corresponding to FIG. 16:

$$P_{12}P_{11}, P_{13}P_{12}, P_{14}P_{13}, P_{15}P_{14}, P_{16}P_{15}, P_{17}P_{16}, P_{18}P_{10}, P_{11}P_{18}$$
front                                                                                                   rear At this point, all the possible cases have been discussed. The algorithm proceeds and considers all the cases mentioned above until the edge list is empty, at which point the triangulation is complete, as shown in FIG. 17. On examining FIG. 17, it is interesting to note that by the time the algorithm reaches the end, all the data points, except the boundary ones, are deleted (note the number of dotted and dashed lines in FIG. 17) and hence the searching part of the algorithm, which is the most time consuming part, becomes faster and faster. The complete triangulation without the disturbing rows and columns lines is illustrated in FIG. 18.

5. The Structure of the Algorithm

The structure of the algorithm as described in the previous section is conceptually very simple and is best explained by the following simple pseudo code:

```
initalize the half edge list with the first two half edges
<P1,P2> and <P2,P1>;
P1.previous = P1.next = P2; P2.previous = P2.next = P1;
while(edge list is not empty)
{
    get current edge <Ps,Pe>;
    found - find_third_point(. . .,P, . . .);
    /* third point found is P */
    if(found)
    {
      if(third point is used)
      {
        touch ← check_touch_case(Ps,P,Pe);
        switch(touch)
        {
          case RIGHT_TOUCH:
            delete front half edge from the edge list;
            delete current rear half edge from the edge list;
            append first half edge to the edge list;
            Pe.previous = P; P.next = Pe;
            break;
          case LEFT_TOUCH;
            delete current rear half edge from the edge list;
            delete half edge before current one from the edge list;
            append second half edge to the edge list;
            Ps.next = P; P.previous = Ps;
            break;
          case NO_TOUCH:
            move front half edge to the rear,
        }
    } else /* third point was not used */
    {
      mark third point as used;
          delete rear half edge from the edge list;
          append first half edge to the edge list;
          append second half edge to the edge list;
          P.previous = Ps; P.next = Pe; Ps.next = P; Pe.previous = P;
      }
    } else /* no point was found */
    {
      delete rear edge from the edge list;
      move front edge to the rear of the edge list;
    }
}
where the check_touch_case (Ps, P, Pe) routine is simply the following:
    check_touch_case(Ps, P Pe)
    {
      if (Ps = = P.next) return(RIGHT_TOUCH);
      if (Pe = = P.previous) return(LEFT_TOUCH);
      return (NO_TOUCH);
    }
```

The algorithm is broken into several subroutines for better structuring. The current implementation contains several useful routines including:

construct_grid( . . . ): constructs the grid structure given the x- and y-coordinates,
   delete_point(. . .): deletes a point from the grid structure,
   find_third_point ( . . . ): given an edge, this routine finds a point to form a new triangle (it returns 1 if such a point is found, and returns 0 otherwise),
   circle(. . .): given three points, the routine returns the center of the circumscribing circle and the bounding box,
   check_row(. . .) and check_column(. . .): check the rows and the columns during the search for points to form triangles, and
   nearest ( . . . ): finds the nearest point to a given data point.

These routines are relatively simple and short can be implemented efficiently.

6. Delaunay Criterion

In this section a proof is given that the algorithm presented above produces a valid Delaunay triangulation, i.e., for each triangle computed no data point is found inside the circumscribing circle. Since the search part of the algorithms considers only the right hand side of each edge, all that needs to be proven is that no point lies inside the circumscribing circle on the left hand side of an edge (since the point with the smallest cosine was chosen, no point lies inside the circle on the right hand side of the edge). This is done in two steps. First, consider the first edge <A,B> (see FIG. 19A). Since B is the nearest point to A, for any point C that forms the first triangle with <A, B>, the edge <A, C> is greater than or equal to <A, B>. Therefore the angle $\angle ACB$ is less than 90 degrees and hence the arc not containing the point C is less than a semi-circle. Therefore if the point D happens to lie inside the circle and to the left of <A, B>, then <A, D> must be shorter than <A, B> which contradicts the fact that B is the nearest point to A.

Next, consider the edge <A,C> of the triangle <A,B,C> computed above (see FIG. 19B). It needs to be proven that any point D that lies on the right of <A, C> and outside the circle <A, B, C> (this circle does not contain any point as <A, B, C> is already a Delaunay triangle) will produce a triangle <A, C, D> whose circumscribing circle does not contain any point that lies on the left of <A, C>. From elementary geometry it follows that if D is outside the circle <A, B, C>, then the circle <A, C, D> can be defined by a point Q lying on the perpendicular bisector of <A, C> beyond the point P, where P is the intersection of the bisector with the circle <A, B, C>. Since the complementary arc of the circle <A, Q, C> is contained entirely in the circle <A, B, C> and to the left of the edge <A, C>, this circle cannot contain any point on the left hand side of <A, C> as the triangle <A, B, C> does not contain any other data point.

Applying the above argument to the edges <A, D>, <A, E>, etc, it can be seen that the triangulation produced by the above algorithm provides a valid Delaunay triangulation.

7. Computing the Convex Hull

It is relatively effortless to compute the convex hull of the data set. The convex hull can be useful for an indication of the boundary of the data set. The algorithm provides two ways to calculate the convex hull. The first method is based on the edge list, and the second method is based on the grid structure. The edge list-based method saves all boundary edges before deleting them from the edge list. Considering the example used for triangulation, the boundary edges are found in the following order:

$P_9P_{17}$, $P_{10}P_8$, $P_{13}P_{20}$, $P_{15}P_{13}$, $P_{17}P_{15}$, $P_{19}P_{10}$, $P_{20}P_{19}$

Since these edges are ordered consistently to begin with, they are hooked up automatically. That is, $P_9P_{17}$ is followed by $P_{17}P_{15}$, which is joined to $P_{15}P_{13}$, etc, and the sequence of edges is closed by the edge $P_{10}P_9$.

The grid structure-based or sparse matrix-based method is even simpler. Referring to FIG. 17, all the points that remain in the sparse matrix at the end of the triangulation process are boundary points. In addition, each point is associated with two pointers, i.e., "previous" and "next", as explained previously. Now, starting at any point remaining in the sparse matrix, one can move along the convex hull either forward (following always the direction defined by the pointer "next") or backward (following the path suggested by the pointer "previous"). As a practical concern, the algorithm computes the directed convex hulls, i.e., the closed polygon is output either clockwise or counterclockwise.

9. Degeneracies

There are two degeneracies that need to be dealt with: (1) collinear, and (2) coincident points. If the entire data set is a set of collinear points, then special considerations are needed. The reasons for this is that no points are found on the left as well as on the right of the first edge. Since in this case the edge list is empty, the program quits without computing the edges along the collinear points. A simple fix is to determine if such situation occurs and to output the line segments based on the ordering inherent in either of the data structures used.

If the data set is not entirely collinear, then no special treatment is necessary as points not lying on the line are found and these points form triangles that make the subset of points non-collinear.

Coincident points do not cause any problem as they are eliminated during building the grid structure (see Section 2).

9. Testing and Examples

Tests have been performed with the triangulation process for a variety of data sets using a PC 486/25 with a math co-processor. The process consumes the most time with randomly distributed data points, i.e., when in general, no more than one point lies in a row or in a column of the sparse matrix. The table below shows the speed (in CPU seconds) at which randomly distributed points ranging in numbers from 200 to 2,000 are sorted, put into a sparse matrix and triangulated. Since random points provide different speeds for different sets of points, three examples of each set were run, and the times were averaged.

| Number of Points | Sorting | Building Sparse Matrix | Triangulation |
| --- | --- | --- | --- |
| 200 | 0.05 | 0.05 | 0.55 |
| 400 | 0.05 | 0.08 | 1.31 |
| 600 | 0.11 | 0.08 | 2.16 |
| 800 | 0.14 | 0.11 | 3.03 |
| 1,000 | 0.14 | 0.19 | 4.16 |
| 1,200 | 0.19 | 0.19 | 5.09 |
| 1,400 | 0.20 | 0.25 | 6.37 |
| 1,600 | 0.21 | 0.30 | 7.60 |
| 1,800 | 0.30 | 0.30 | 8.82 |
| 2,000 | 0.31 | 0.38 | 10.29 |

Figure 20:
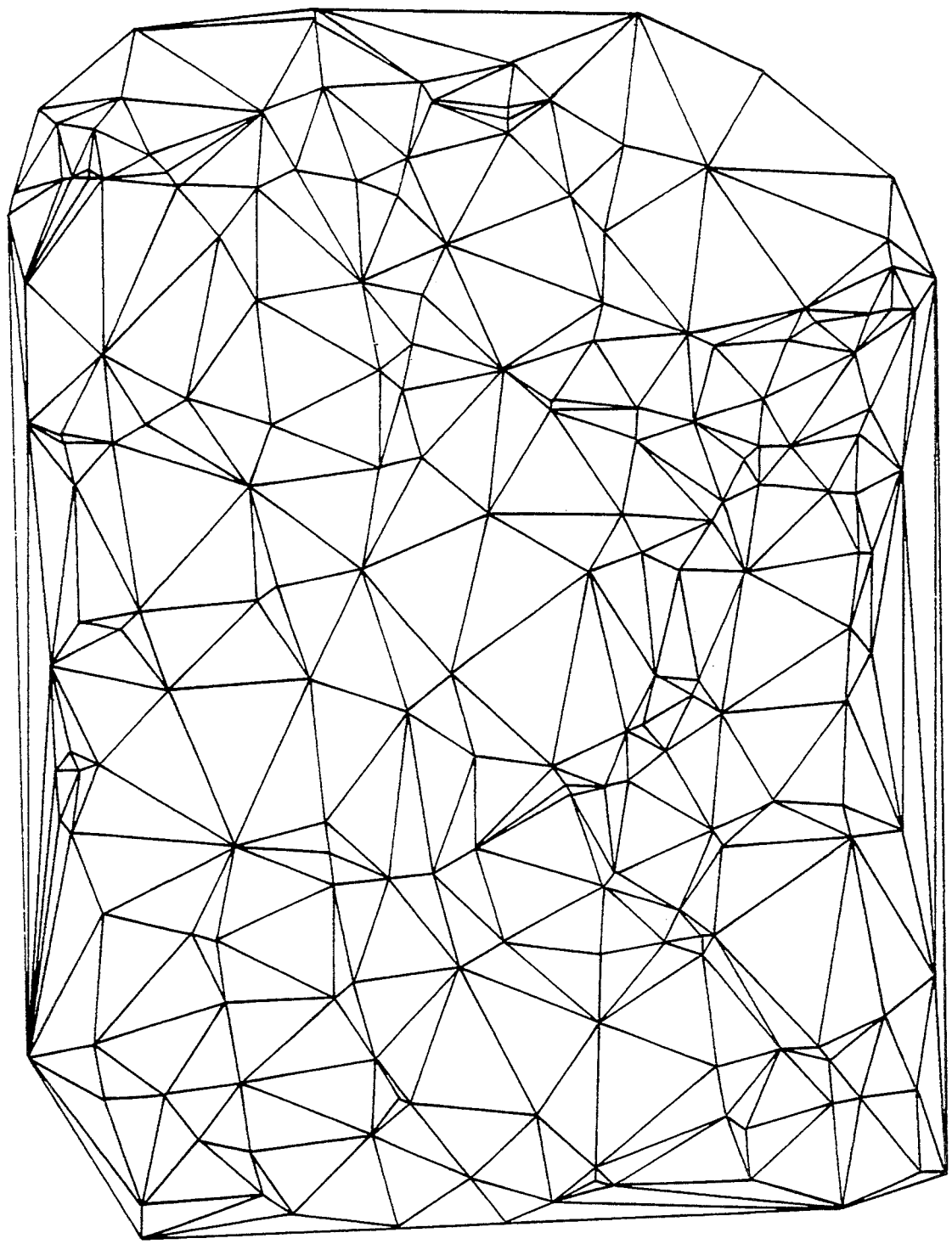
Figure 21:
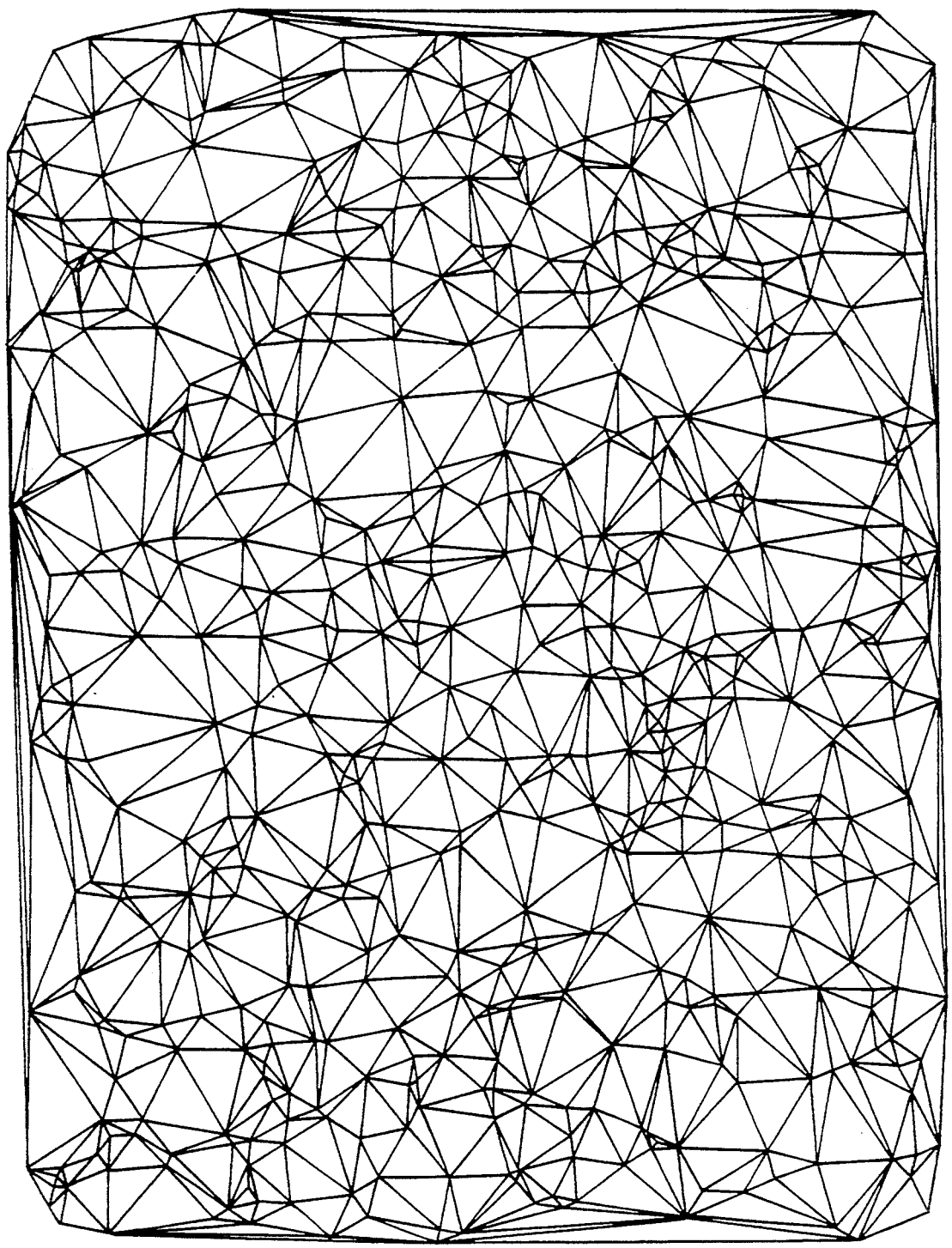
Figure 22:
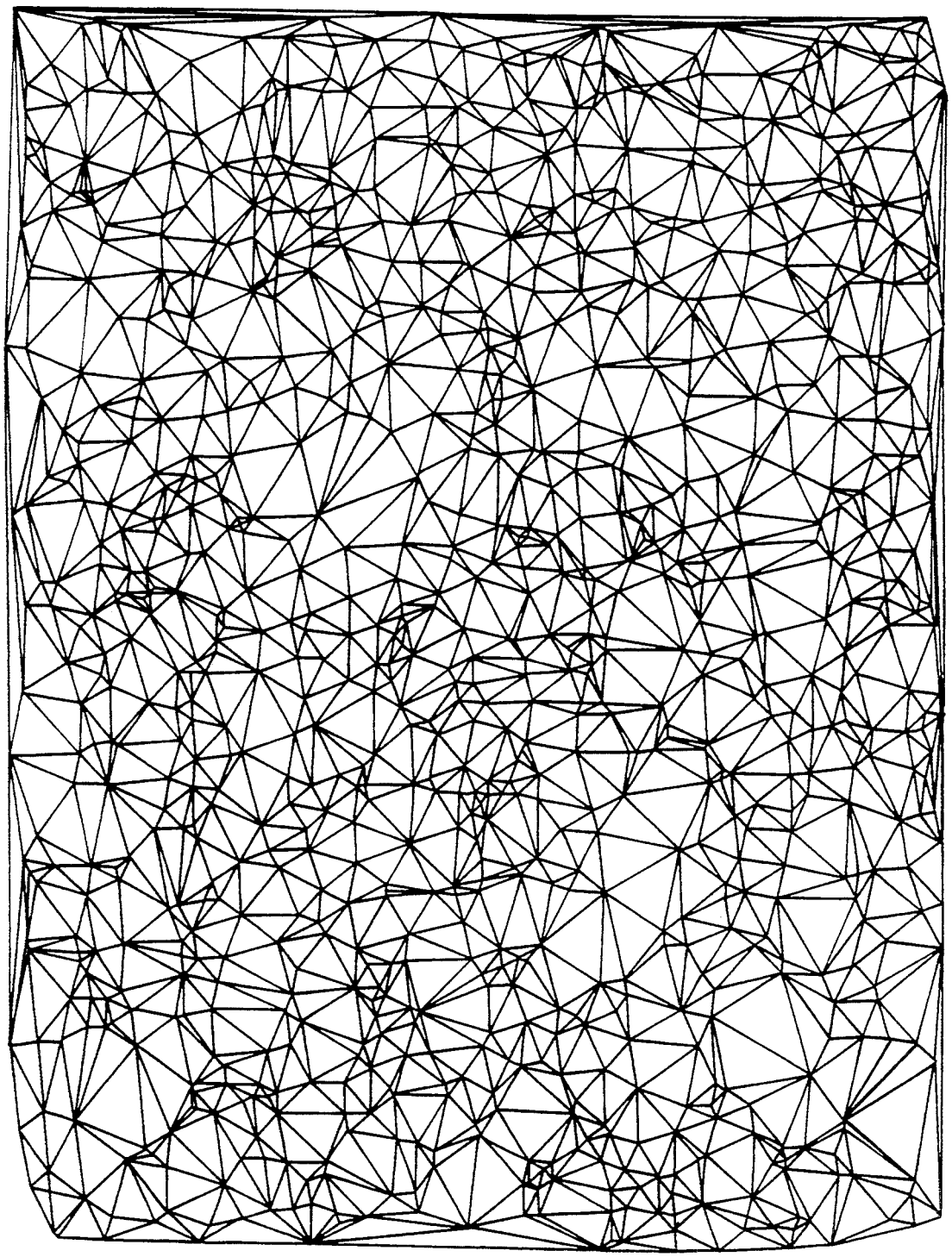
Figure 23:
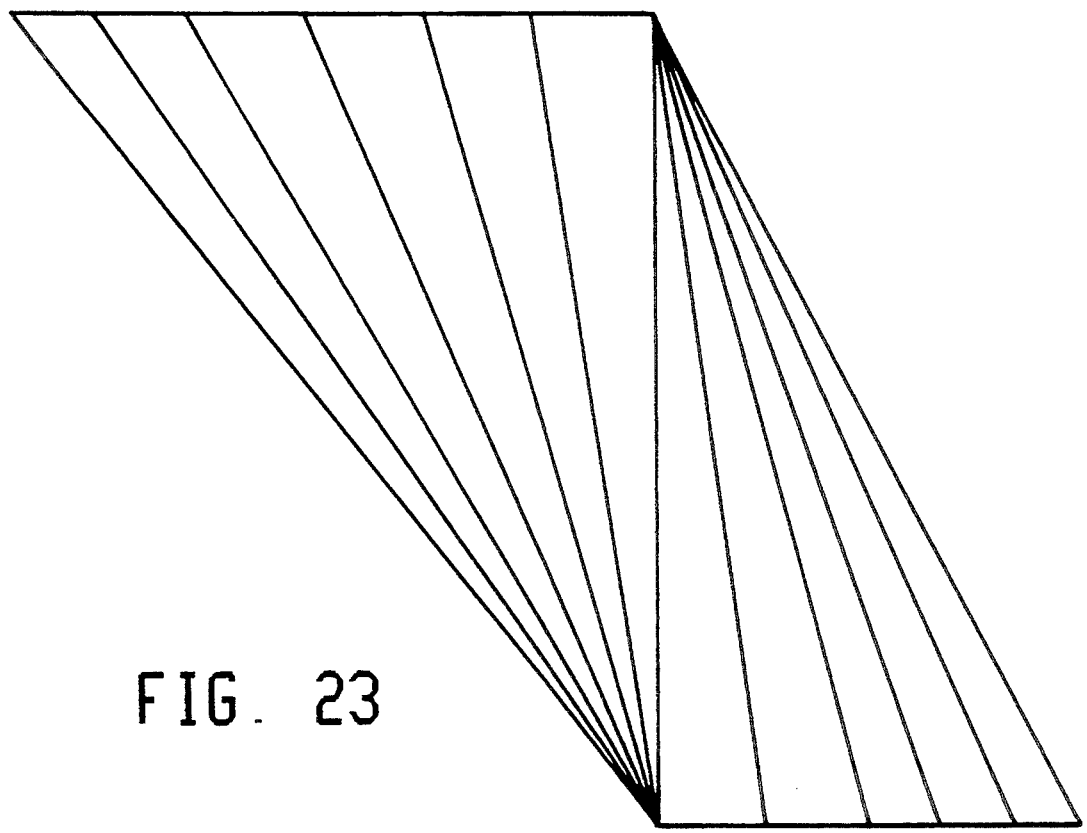
Figure 24:
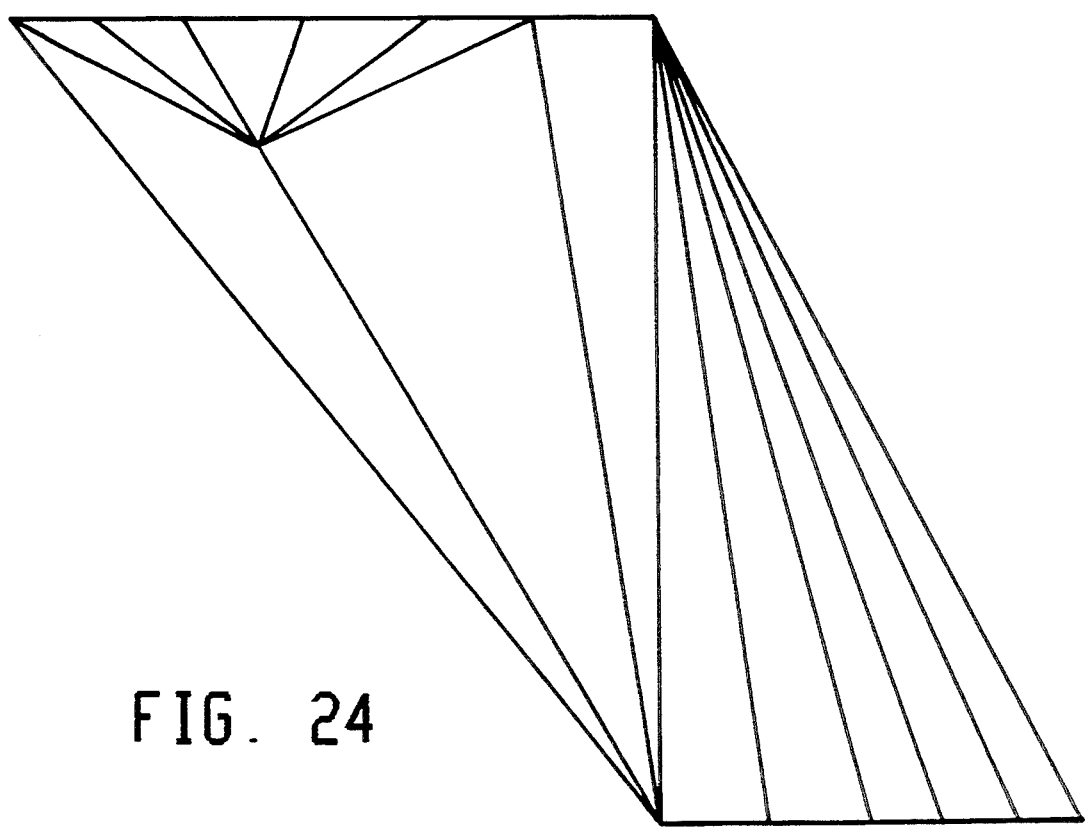
Figure 25:
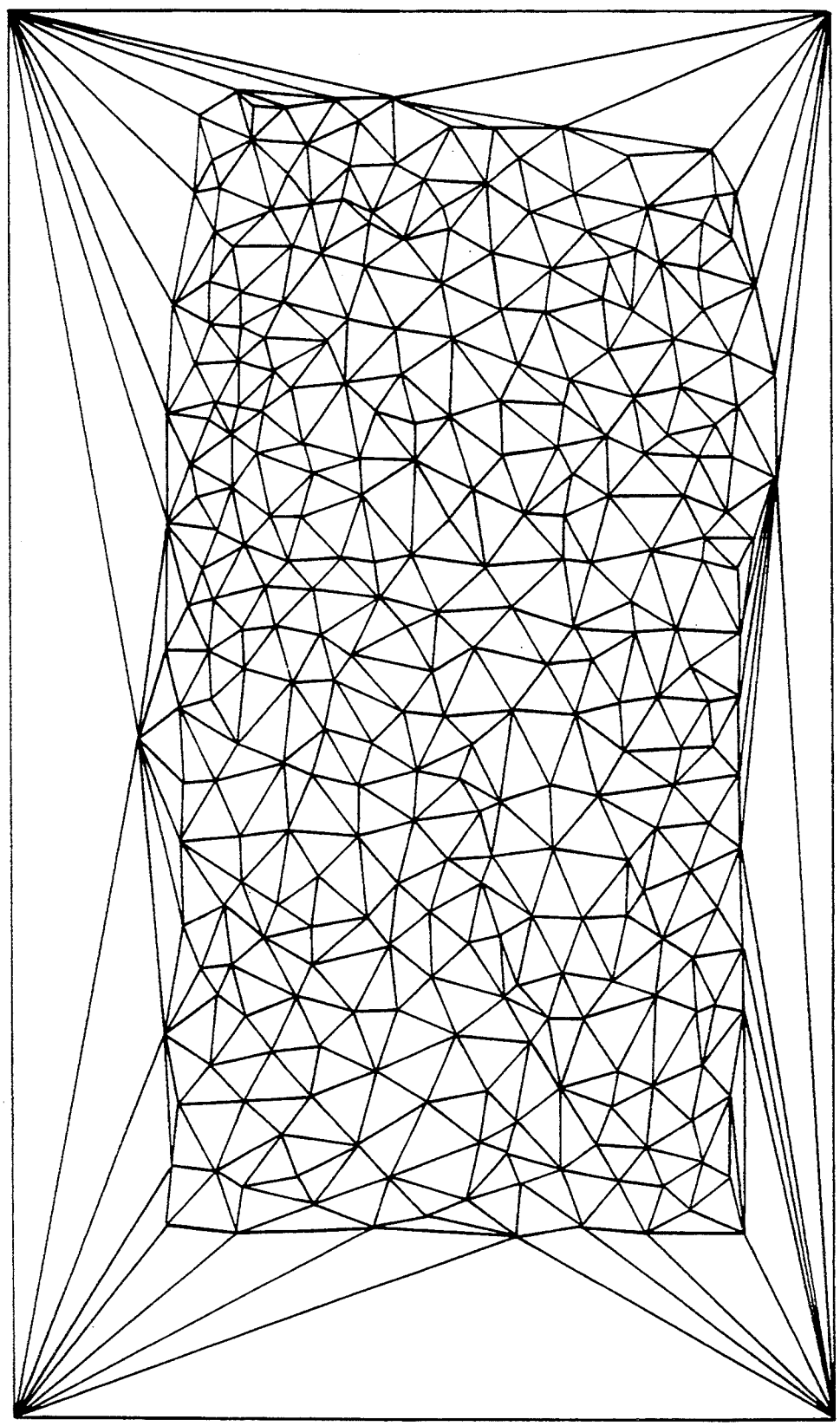
Figure 26:
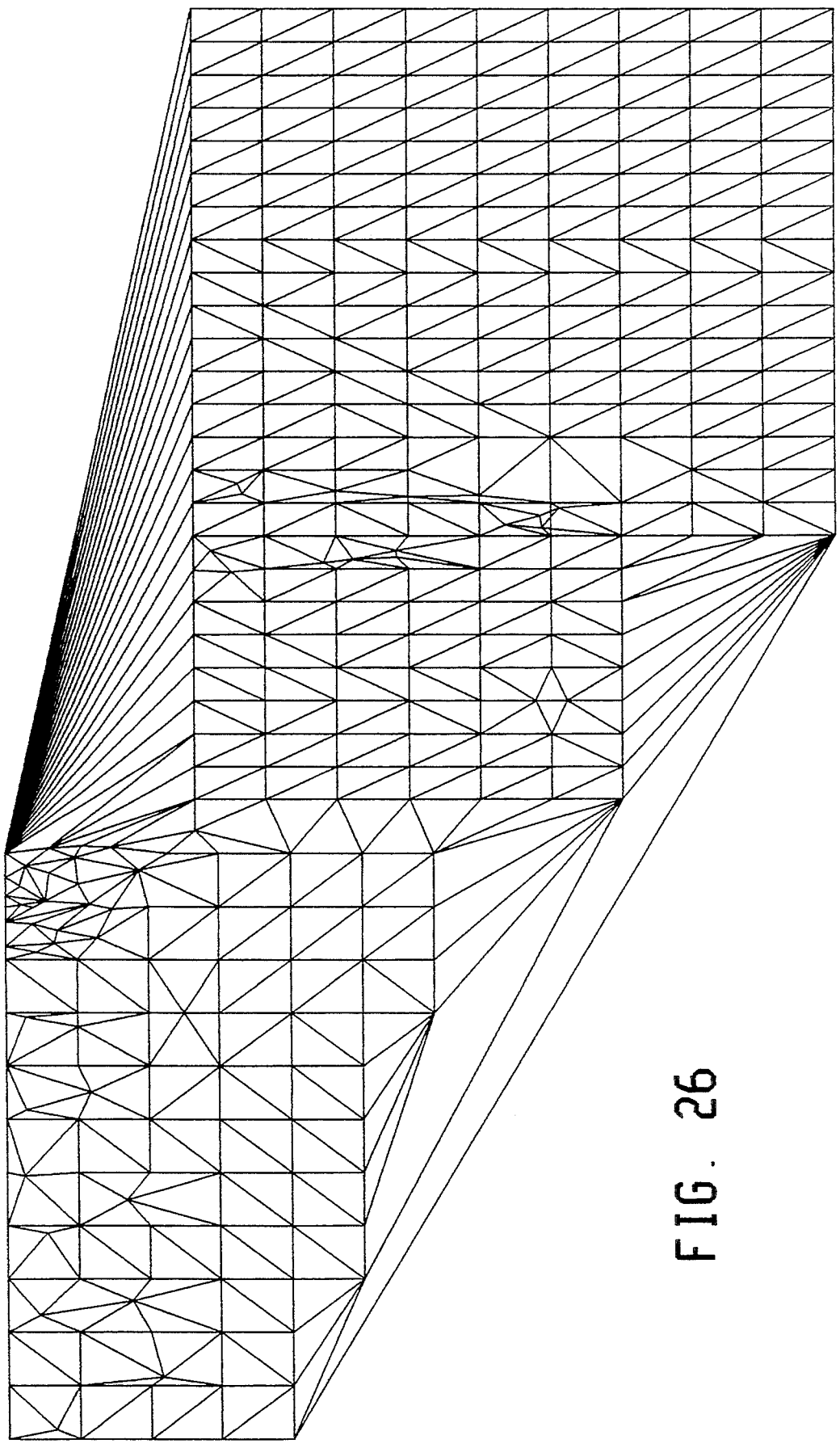

FIGS. 20-22 illustrate some of the data sets. More exotic examples are shown in FIGS. 23-26. FIG. 24 shows a data set that is considered difficult in L. Guibas, D. E. Knuth and M. Sharir, "Randomized Incremental Construction of Delaunay and Voronoi Diagrams", TR 481, Department of Computer Science, New York University, Courant Institute of Mathematical Sciences, January, 1990. In FIG. 25 four points were placed reasonably far from the rest of the points to test how the process performs in case of uneven point distribution. FIG. 26 shows a typical practical example that is used in digital terrain modeling. It took 0.6 second to triangulate the data set of FIG. 26. If the same number of random points is generated, the triangulation of these points takes 1.15 seconds, almost twice as long.

For the uniform grid, the table below shows the speed (in CPU seconds) for randomly distributed points ranging in numbers from 500 to 5,000 to be put into a grid structure and triangulated. Since randomly distributed points give different results for different data sets, 5 examples of each set were run, e.g., 5 times 1,000 points, and the times were averaged.

| Number of Points | Building the Grid Structure | Triangulation |
| --- | --- | --- |
| 500 | 0.274725 | 1.351648 |
| 1,000 | 0.494505 | 2.681319 |
| 1,500 | 0.714286 | 3.989011 |
| 2,000 | 0.879121 | 5.285714 |
| 2,500 | 1.043956 | 6.670330 |
| 3,000 | 1.318681 | 7.989011 |
| 3,500 | 1.483516 | 9.329670 |
| 4,000 | 1.648352 | 10.670329 |
| 4,500 | 1.868132 | 11.956044 |
| 5,000 | 2.087912 | 13.230769 |

FIGS. 27–29 illustrate some of the data sets that were used. FIG. 30 shows the graphical relationship between the number of points and the triangulation times. The algorithm was tested with a large number of data points and the practical time complexity was found to be (steadily) linear.

10. Output Generation

In order for the triangulation to be useful for further processing, the computed triangles should be stored in some way. The output data structure is created in a number of ways, e.g., using the concept of a winged edge data structure. Preferably, the method is based on a point list which allows the creation of the output on the fly. In fact, the edge list can be replaced by the point list and the triangulation can be controlled by this list. In the following discussion, the new data structure is introduced and it is shown how it can be used to control the triangulation and to form the output at the same time.

Consider the example shown in FIG. 31. Two point lists are used; i.e., in the first all interior points are listed, and in the second all boundary points are listed. For each point, all points are listed in clockwise order that surround that point. The data structure representing the triangles, the edges, and the points of the triangulation shown in FIG. 31 is as follows:

```
3 5 6 4 1 2
6 8 7 4 3 5

5 8 6 3 2
8 7 6 5
7 4 6 8
4 1 3 6 7
1 2 3 4
2 5 3 1
```

The points in the first column below the double line are boundary points, whereas those above the double line are internal ones. The above data structure allows all geometric queries to be simply and quickly determined. A few examples are:

All triangles incident at a point. For point 3: <3,5,6>, <3,6,4>, <3,4,1>, <3,1,2> and <3,2,5>. For the boundary point 5: <5,8,6>, <5,6,3>, and <5,3,2>.

All triangles incident on an edge. For edge <3, 6> one gets <3, 6,4> from 3's list and <6, 3, 5> from 6's list. If the edge is <2,1>, then from 2's list it follows that <2,1> is a boundary edge, and from 1's list <1, 2, 3> is obtained.

All edges incident at a point. For 7: <7,4>, <7,6> and <7,8>.

All triangles neighboring to a given triangle. If the given triangle is <3, 6,4>, then the triangles incident on the half edges <3, 6>, <6, 4> and <4, 3> are sought. From 6's list <6,3,5> is obtained; from 4's list <4,6,7> is obtained and from 3's list <3,4,1> is computed.

The above data structure is very compact and simple subroutines can be written that perform most of the data structure browsing operations.

Further, the triangulation process and the data structure computation can be combined using the point list. The same figures as in Section 4 are used to explain how to form triangles and how to compute the data structure simultaneously. In FIG. 5 the first edge is obtained. The two half edges are put into the following lists:

```
F  1 | 2
L  2 | 1
```

The current edge is <1,2> which is F(1)L(1). After the point 3 is found (see FIG. 6), the list is updated as follows:
 1. append 3 to the list of F,
 2. insert 3 to the second position of L's list,
 3. create a new list and add 3 and append F(1) and L(1) to the list, and
 4. advance the pointer L.

The new list corresponding to FIG. 6 is as follows:

```
F  1 | 2  3
   2 | 3  1
L  3 | 1  2
```

The current edge is F(1)L(1)=<1, 3> and the new point found is 4 (see FIG. 7). Following the same procedure, the edge list becomes:

```
F  1 | 2  3  4
   2 | 3  1
   3 | 4  1  2
L  4 | 1  3
```

The first important case to illustrate is the right touch shown in FIG. 8. The corresponding edge list is:

```
F  1 | 2  3  4  5  6  7  8
   2 | 3  1
   3 | 4  1  2
   4 | 5  1  3
   5 | 6  1  4
   6 | 7  1  5
   7 | 8  1  6
L  8 | 1  7
```

The current edge is <1,8> and the point 2 is found. A right touch is detected (using a simple function described in Section 4.5) and the list is updated as follows:
 1. save the list of F,
 2. append L(1) to the end of the list following F,
 3. insert F(2) to the second position of L, and
 4. advance F.

The edge list after right touch processing, and corresponding to FIG. 9, looks like this:

```
F  2 | 3  1  8
   3 | 4  1  2
   4 | 5  1  3
   5 | 6  1  4
   6 | 7  1  5
   7 | 8  1  6
L  8 | 2  1  7
```

The next case to be illustrated is no touch shown in FIG. 12. The corresponding point lists are as follows:

```
F  7 | 8  1  6  16
   8 | 9  3  2  1  7
   9 |10  3  8
  10 |11  3  9
  11 |12  4  3  10
  12 |13  4  11
  13 |14  4  12
  14 |15  5  4  13
  15 |16  6  5  14
L 16 | 7  6  15
```

The current edge is <7,16> and the point 9 is found. The no touch case is processed as follows:

1. copy F's list to the end, and
2. advance F and L.

If the lists are arranged in a circular fashion, then the pointers F and L are simply advanced.

The left touch is illustrated in FIG. 13. The corresponding lists are:

```
F  9 |10  3  8  7
  10 |11  3  9
  11 |12  4  3  10
  12 |13  4  11
  13 |14  4  12
  14 |15  5  4  13
  15 |16  6  5  14
  16 | 7  6  15
L  7 | 9  8  1  6  16
```

The current edge is <9, 7>, the point 16 is found and left touch is detected. The left touch is processed as follows:

1. save the list of L,
2. append L(last) to the end of F's list,
3. decrement L, and
4. insert F(1) to the second position of the list of L.

The point lists corresponding to FIG. 14 are as follows:

```
F  9 |10  3  8  7  16
  10 |11  3  9
  11 |12  4  3  10
  12 |13  4  11
  13 |14  4  12
  14 |15  5  4  13
  15 |16  6  5  14
L 16 | 9  7  6  16
```

The final configuration to be discussed is illustrated in FIG. 15. The corresponding data structure is:

```
F  9 |10  3  8  7  16  17
  10 |11  3  9
  11 |12  4  3  10
  12 |13  4  11
  13 |14  4  12
  14 |15  5  4  13
  15 |16  6  5  14
  16 |17  9  7  6  15
L 17 | 9  16
```

The current edge is <9, 17> and no point is found, i.e., the edge is a boundary edge. In this case, both pointers F and L are advanced.

At the end of the triangulation process two kinds of data are provided: (1) point lists that are saved (after each left and right touch), and (2) lists remaining in the internal circular structure. Referring to FIG. 17, the saved point lists are:

```
 1 | 2  3  4  5  6  7  8
 2 | 3  1  7  8
 3 | 4  1  2  8  9 10
 4 | 5  1  3 11 12 13 14
 5 | 6  1  4 14 15
 7 | 8  2  1  6 16  9
 6 | 7  1  5 15 16
11 |12  4  3 10 18
14 |15  5  4 13
16 |17  9  7  6 16
18 |19 12 11 10
12 |18 19 20 13  4 11
 8 | 9  2  1  7
``` whereas those remaining in the circular list are:

```
20 |13 12 19
13 |15 14  4 12 20
15 |17 16  6  5 14 13
17 | 9 16 15
 9 |10  3  8  7 16 17
19 |20 12 18 10
10 |19 18 11  3  9
```

Note that this list contains all the boundary points and traversing them from top to bottom gives the convex hull of the data set. The full data structure that represents the triangulation (FIG. 17) is obtained by merging the two lists as follows:

```
 1 | 2  3  4  5  6  7  8
 2 | 3  1  7  8
 3 | 4  1  2  8  9  10
 4 | 5  1  3  11 12 13 14
 5 | 6  1  4  14 15
 7 | 8  2  1  6  16 9
 6 | 7  1  5  15 16
11 | 12 4  3  10 18
14 | 15 5  4  13
16 | 17 9  7  6  16
18 | 19 12 11 10
12 | 18 19 20 13 4  11
 8 | 9  2  1  7
20 | 13 12 19
13 | 15 14 4  12 20
15 | 17 16 6  5  14 13
17 | 9  16 15
 9 | 10 3  8  7  16 7
19 | 20 12 18 10
10 | 19 18 11 3  9
```

Accordingly, the point list described above provides a compact and simple method for storing points from the triangulation process, as well as providing a method which controls the triangulation process and simultaneously forms the output.

As described above, the present invention provides a simple method for triangulating randomly or regularly distributed data. The method is based on a sparse matrix and uniform grid data structure and on a triangulation strategy that builds triangles in a circular fashion. The triangulation strategy eliminates points from the data structure as triangles are formed, and hence decreases the time it takes to find subsequent triangle points. The time complexity of the process is slightly greater than linear for the sparse matrix method, and is linear for the grid-based method. Regularly placed points, very frequent in practical applications, can be triangulated faster than random ones, which makes the process a good candidate for applications such as digital terrain modeling. Further, the algorithm produces the convex hull of the data set at no extra cost in overhead.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A method of producing an electronic data structure representing an image of an object including the steps of (i) providing a random and scattered array of data points on an electronic 2-dimensional plane, the data points relating to a portion of the object, and (ii) triangulating the data points on the 2-dimensional plane to produce an electronic data structure representing an image of the portion of the object; said step of triangulating the data points comprising the steps of:
   preprocessing the data points and arranging the data points in a data structure, and
   forming a triangle, the step of forming the triangle, including:
   i) determining an initial point in the data structure,
   ii) determining the nearest point to the initial point in the data structure to form a first edge,
   iii) determining a third point in the data structure nearest the first edge to form the triangle with the initial and nearest points, the third point being determined by:
      a) forming a triangle using the first edge, a second edge emanating vertically from the initial point and a third edge emanating horizontally from the nearest point and intersecting the second edge,
      b) searching the triangle for points and computing which point forms the smallest cosine with the initial point and the nearest point,
      c) computing a circle through the initial point, the nearest point and the found point with the smallest cosine, thereby forming the smallest circle, and
      d) setting a bounding box for the smallest circle and checking for other points inside the box, and if other points are found, then determining the smallest circle for the other points and comparing the smallest circle for the other points with the smallest circle of step c) immediately above to determine whether the bounding box should be updated.

2. A method as in claim 1, wherein the data points are initially sorted in the x and y directions and arranged in a sparse matrix where each x and y data point value is associated with a record.

3. A method as in claims 2, wherein the initial point is determined by calculating the middle position in the data structure, checking if a point is present in the middle position of the data structure, and if so, using the point in the middle position of the data structure as the initial point.

4. A method as in claim 3, wherein if no point is present in the middle position of the data structure, then determining an initial point using the following steps:
   i) setting a value DMIN to a value larger than the largest expected distance from the middle position to the nearest point,
   ii) computing a box around the middle position of the data structure,
   iii) computing the shortest distance DSHORT from the middle position to the sides of the box,
   iv) comparing DSHORT to DMIN, and if DSHORT is less than DMIN, then checking the data structure for points, and if points are found, then setting the component DMIN to DSHORT, and
   v) enlarging the box until DSHORT is equal to or greater than DMIN.

5. A method as in claim 4, wherein the nearest point is determined by:
   i) setting a value DMIN to a value larger than the largest expected distance from the middle position to the nearest point,
   ii) computing a box around the initial point,
   iii) computing the shortest distance DSHORT from the initial point to the sides of the box,
   iv) comparing DSHORT to DMIN, and if DSHORT is less than DMIN, then check the data structure for points, if points are found, then setting the component DMIN to DSHORT, and
   v) enlarging the box until DSHORT is equal to or greater than DMIN.

6. A method of producing an electronic data structure representing an image of an object according to claim 5 wherein said step of setting a value DMIN to a value larger than the largest expected distance from the middle position to the nearest point comprises the step of setting a value DMIN to a value equal to or larger than the length of the longest diagonal of the data points.

7. A method of producing an electronic data structure representing an image of an object according to claim 4 wherein said step of setting a value DMIN to a value larger than the largest expected distance from the middle position to the nearest point comprises the step of setting a value DMIN to a value equal to or larger than the length of the longest diagonal of the data points.

8. A method as in claim 2, wherein the third point in the data structure is determined by:
   i) calculating the point T, the intersection of the horizontal and vertical lines emanating from the initial point and the nearest point,
   ii) searching for points inside the triangle ATB, where A is the initial point and B is the nearest point,
   iii) if points are found, selecting the point for which the cosine of the angle ($AP_iB$) is the smallest, where $P_i$ is the found point,
   iv) if points are not found, then searching a row $A_0T_0$ and the column $T_0B_0$; if no points are found, then continuing to search the rows and columns until $A_iT_i$ and column $T_iB_i$ is reached, where i is the last row and column,
   v) after points are found, computing circles through A, B and the found points, and determining which circle is the smallest,
   vi) setting a bounding box of the smallest circle and continuing the search until the row and column do not exceed the box limits, then:
      a) checking for other points inside the box,
      b) if points are found, then determining the smallest circle for the other points,
      c) if the smallest circle for the other points is smaller than the the smallest circle determined in step v above, updating the box and checking again for points inside the box to determine if an even smaller circle can be created.

9. A method as in claim 8, wherein the triangle created by the points forming the smallest circle is a Delaunay triangle.

10. A method as in claim 1, wherein a uniform grid is initially calculated for the data points, with each data point being associated with only one grid cell in the uniform grid.

11. A method as in claims 10, wherein the initial point is determined by calculating the middle position in the data structure, checking if a point is present in the middle position of the data structure, and if so, using the point in the middle position of the data structure as the initial point.

12. A method as in claim 11, wherein if no point is present in the middle position of the data structure, then determining the initial point by searching neighboring cells until a point is found.

13. A method as in claim 12, wherein the nearest point is determined by:
   i) setting a value DMIN to a value larger than the largest expected distance from the middle position to the nearest point,
   ii) computing a box around the initial point,
   iii) checking the cell having the initial point to determine if more than one point is in the cell, and if more than one point is in the cell, then determining the point that is nearest to the initial point and determining the distance DSHORT from the nearest point to the initial point,
   iv) comparing DSHORT to DMIN, and if DSHORT is less than DMIN, then setting DMIN equal to DSHORT.

14. A method of producing an electronic data structure representing an image of an object according to claim 13 wherein said step of setting a value DMIN to a value larger than the largest expected distance from the middle position to the nearest point comprises the step of setting a value DMIN to a value equal to or larger than the length of the longest diagonal of the data points.

15. A method as in claim 10, wherein the third point in the data structure is determined by:
   a) searching the data structure on one side of the first edge AB, where A is the initial point and B is the nearest point,
   b) forming a triangle using the cells which intersect the first edge, the cells which emanate horizontally from the initial point and which intersect cells emanating vertically from the nearest point, and the cells which emanate vertically from the nearest point,
   c) searching for points inside each cell in the triangle,
   d) if points are found, selecting the point for which the cosine of the angle ($AP_iB$) is the largest, where $P_i$ is the found point,
   e) computing a circle through A, B and the found point with the smallest cosine, and
   f) setting a bounding box of the circle and searching rows and columns of cells and checking for points in the cells, and if points are found, selecting the point with the smallest cosine, computing a circle through A, B and the newly found point, and if the new circle is smaller than the original circle, updating the bounding box and continuing the search for points in the box.

16. A method as in claim 15, wherein the triangle created by the points forming the smallest circle is a Delaunay triangle.

17. A method as in claim 1 wherein the first edge is entered into an edge list comprising a circular queue, and each additional edge of the triangle is entered into the rear position in the circular queue as each additional edge is determined.

18. A method of producing an electronic data structure representing an image of an object according to claim 1 wherein said step of determining an initial point in the data structure comprises the step of determining an initial point substantially in the middle of the data structure.

19. A method of producing an electronic data structure representing an image of an object including the steps of (i) providing a random and scattered array of data points on an electronic 2-dimensional plane, the data points relating to a portion of the object, and (ii) triangulating the data points on the 2-dimensional plane to produce an electronic data structure representing an image of the portion of the object; said step of triangulating the data points comprising the steps of:
   preprocessing the data points and arranging the data points in a data structure, forming triangles, the step of forming the triangles comprising the steps of:
  i) determining an initial point in the data structure,
  ii) determining the nearest point to the initial point in the data structure to form a first edge,
  iii) determining a third point in the data structure nearest the first edge to form second and third edges of a first triangle with the initial and nearest points,
entering the first edge into a circular queue, and entering each additional edge of the first triangle into the rear position in the circular queue when each additional edge is determined, and
determining an additional point in the data structure nearest each said edge in the rear position of the circular queue to form two further edges of a second triangle,
entering each further edge of the second triangle into the rear position in the circular queue when each further edge is determined, and
forming additional triangles until all the points are associated with at least one triangle.

20. A method as in claim 19, wherein an edge from a previous triangle in the circular queue is deleted if one of the further edges of the second triangle or of any of the additional triangles is the same as the edge in the circular queue from a previous triangle.

21. A method as in claim 19, wherein the initial, nearest and third points in each triangle are entered into a point list when the initial, nearest and third points are determined.

22. A method of producing an electronic data structure representing an image of an object according to claim 19 wherein said step of determining an initial point in the data structure comprises the step of determining an initial point substantially in the middle of the data structure.

23. A method of producing an electronic data structure representing an image of an object including the steps of (i) providing a random and scattered array of data points on an electronic 2-dimensional plane, the data points relating to a portion of the object, and (ii) triangulating the data points on the 2-dimensional plane to produce an electronic data structure representing an image of the portion of the object; said step of triangulating the data points comprising the steps of:
  (a) determining pairs of data points, each pair having a first data point and a second data point;
  (b) searching for candidate points for at least one third data point for each pair of data points, thereby forming a triangle with the first, second, and third data points, the triangle meeting the Delaunay criterion; and
  (c) after finding at least one candidate point, limiting the search for the at least one third data point to points located within an area having a fixed relationship between the first and second data points and the candidate point;
  (d) determining which of the candidate points is the third point that forms a triangle with the first, second, and third data points, the triangle meeting the Delaunay criterion.

24. A method of producing an electronic data structure representing an image of an object according to claim 23 wherein said step of limiting the search for the at least one third data point comprises the step of limiting the search for the at least one third data point to points located within an area defined by a square bounding the circle determined by the first and second data points and the candidate point.

25. A method of producing an electronic data structure representing an image of an object according to claim 23 further comprising the steps of:
  (a) determining all possible Delaunay triangles involving at least one data point; and
  (b) eliminating the at least one data point as being a possible candidate point when all possible Delaunay triangles involving the at least one data point have been determined.

26. A method of producing an electronic data structure representing an image of an object according to claim 25 wherein said step of determining all possible Delaunay triangles involving at least one data point comprises the steps of:
  (a) forming Delaunay triangles around the at least one point using a circular queue to sequentially discover all the third data points, wherein the third data point for the previous triangle becomes the pair of data points with the at least one point; and
  (b) determining that all possible third points forming Delaunay triangles for the at least one point have been discovered when a final formed triangle is positioned adjacent to a triangle formed before the triangle formed immediately before the final formed triangle.

* * * * *